(12) United States Patent  (10) Patent No.: US 9,183,199 B2
Wu  (45) Date of Patent: *Nov. 10, 2015

(54) COMMUNICATION DEVICE FOR MULTIPLE LANGUAGE TRANSLATION SYSTEM

(76) Inventor: Ming-Yuan Wu, Taipei (TW)

(*) Notice: Subject to any disclaimer, the term of this patent is extended or adjusted under 35 U.S.C. 154(b) by 1015 days.

This patent is subject to a terminal disclaimer.

(21) Appl. No.: 13/072,295

(22) Filed: Mar. 25, 2011

(65) Prior Publication Data

US 2012/0245920 A1  Sep. 27, 2012

(51) Int. Cl.
*G06F 17/28* (2006.01)

(52) U.S. Cl.
CPC .................................. *G06F 17/289* (2013.01)

(58) Field of Classification Search
CPC ............ G06F 17/289; G06F 17/2872; G06F 17/2836; G06F 17/2755; G06F 17/271; G06F 17/274; G06F 17/275; G06F 17/277; G06F 17/2715; G06F 17/2735; G06F 17/2785; G06F 17/2795; G06F 17/2818; G06F 17/2827; G06F 17/2863; G06F 9/4448
USPC ............................................................ 704/3
See application file for complete search history.

(56) References Cited

U.S. PATENT DOCUMENTS

| | | | |
|---|---|---|---|
| 6,636,732 B1 * | 10/2003 | Boling et al. | 455/404.1 |
| 7,117,374 B2 * | 10/2006 | Hill et al. | 713/193 |
| 8,041,018 B2 * | 10/2011 | Wald et al. | 379/202.01 |
| 8,188,880 B1 * | 5/2012 | Chi et al. | 340/815.45 |
| 8,494,318 B2 * | 7/2013 | Bolla et al. | 385/32 |
| 8,503,087 B1 * | 8/2013 | Amirparviz | 359/630 |
| 8,582,209 B1 * | 11/2013 | Amirparviz | 359/630 |
| 8,638,363 B2 * | 1/2014 | King et al. | 348/135 |
| 8,743,464 B1 * | 6/2014 | Amirparviz | 359/633 |
| 8,775,154 B2 * | 7/2014 | Clinchant et al. | 704/2 |
| 2003/0061052 A1 * | 3/2003 | Breuer | 704/266 |
| 2003/0177025 A1 * | 9/2003 | Curkendall et al. | 705/1 |
| 2004/0167784 A1 * | 8/2004 | Travieso et al. | 704/270.1 |
| 2005/0122537 A1 * | 6/2005 | Shin et al. | 358/1.13 |
| 2007/0016401 A1 * | 1/2007 | Ehsani et al. | 704/9 |
| 2007/0050306 A1 * | 3/2007 | McQueen | 705/77 |
| 2009/0112708 A1 * | 4/2009 | Barhydt et al. | 705/14 |
| 2009/0240485 A1 * | 9/2009 | Dalal et al. | 704/2 |
| 2009/0281789 A1 * | 11/2009 | Waibel et al. | 704/3 |
| 2009/0303199 A1 * | 12/2009 | Cho et al. | 345/173 |
| 2010/0007582 A1 * | 1/2010 | Zalewski | 345/8 |
| 2010/0030549 A1 * | 2/2010 | Lee et al. | 704/4 |
| 2010/0064536 A1 * | 3/2010 | Caskey et al. | 33/303 |
| 2010/0070262 A1 * | 3/2010 | Udupa et al. | 704/7 |
| 2011/0047149 A1 * | 2/2011 | Vaananen | 707/723 |
| 2011/0063141 A1 * | 3/2011 | Gabay | 341/23 |
| 2011/0120448 A1 * | 5/2011 | Fitch et al. | 126/601 |

(Continued)

*Primary Examiner* — Paras D Shah
*Assistant Examiner* — Fariba Sirjani
(74) *Attorney, Agent, or Firm* — Muncy, Geissler, Olds & Lowe P.C.

(57) ABSTRACT

A communication device for a multiple language translation system is disclosed. The communication device allows users to communicate with others using their own preferred language and the communication device provides a translation for each user in their preferred language. The communication device comprises a wireless transceiver for communicating with other users, networks, and the Internet. Operation switches are provided for controlling operation of the communication device. Signal indicators visually show status or conditions. A user hears the translation via an earphone or sees the translation on a display. A remote control allows the communication device to be controlled remotely.

19 Claims, 37 Drawing Sheets

(56) References Cited

U.S. PATENT DOCUMENTS

| | | | |
|---|---|---|---|
| 2011/0279666 A1* | 11/2011 | Strombom et al. | 348/78 |
| 2011/0288849 A1* | 11/2011 | Jang et al. | 704/2 |
| 2012/0033620 A1* | 2/2012 | Thoen et al. | 370/329 |
| 2012/0065957 A1* | 3/2012 | Jungblut | 704/3 |
| 2012/0113092 A1* | 5/2012 | Bar-Zeev et al. | 345/419 |
| 2012/0127062 A1* | 5/2012 | Bar-Zeev et al. | 345/6 |
| 2012/0245449 A1* | 9/2012 | Williams et al. | 600/377 |

\* cited by examiner

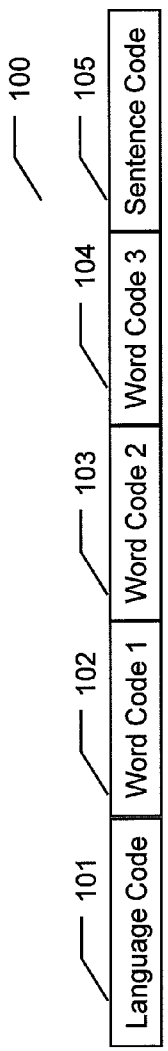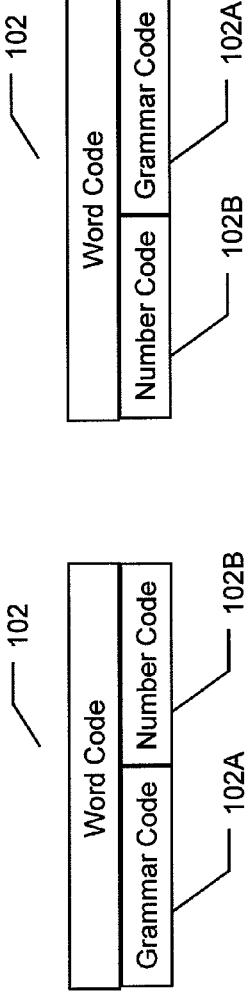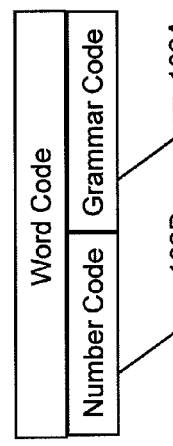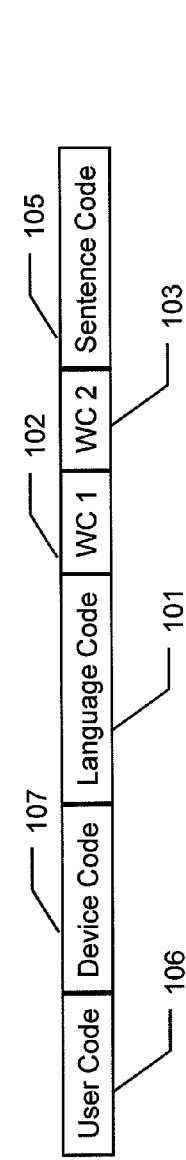
Figure 1A
Figure 1B
Figure 1C
Figure 1D

| Word Code | | |
|---|---|---|
| Language Code | Number Code | Grammar Code |
| 01 | 123 | 45 |
| 02 | 123 | 46 |
| 03 | 124 | 45 |

| |
|---|
| Language 1 |
| Language 2 |
| Language 3 |

Figure 1E

| A | 1 | K | 11 | U | 21 |
| B | 2 | L | 12 | V | 22 |
| C | 3 | M | 13 | W | 23 |
| D | 4 | N | 14 | X | 24 |
| E | 5 | O | 15 | Y | 25 |
| F | 6 | P | 16 | Z | 26 |
| G | 7 | Q | 17 | | |
| H | 8 | R | 18 | | |
| I | 9 | S | 19 | | |
| J | 10 | T | 20 | | |

Figure 12A

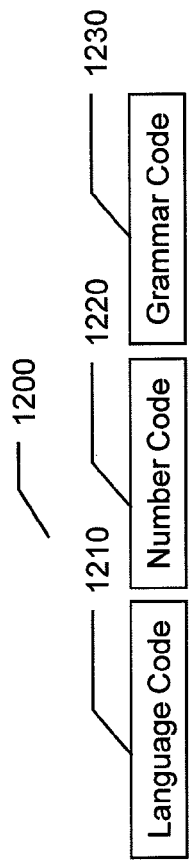
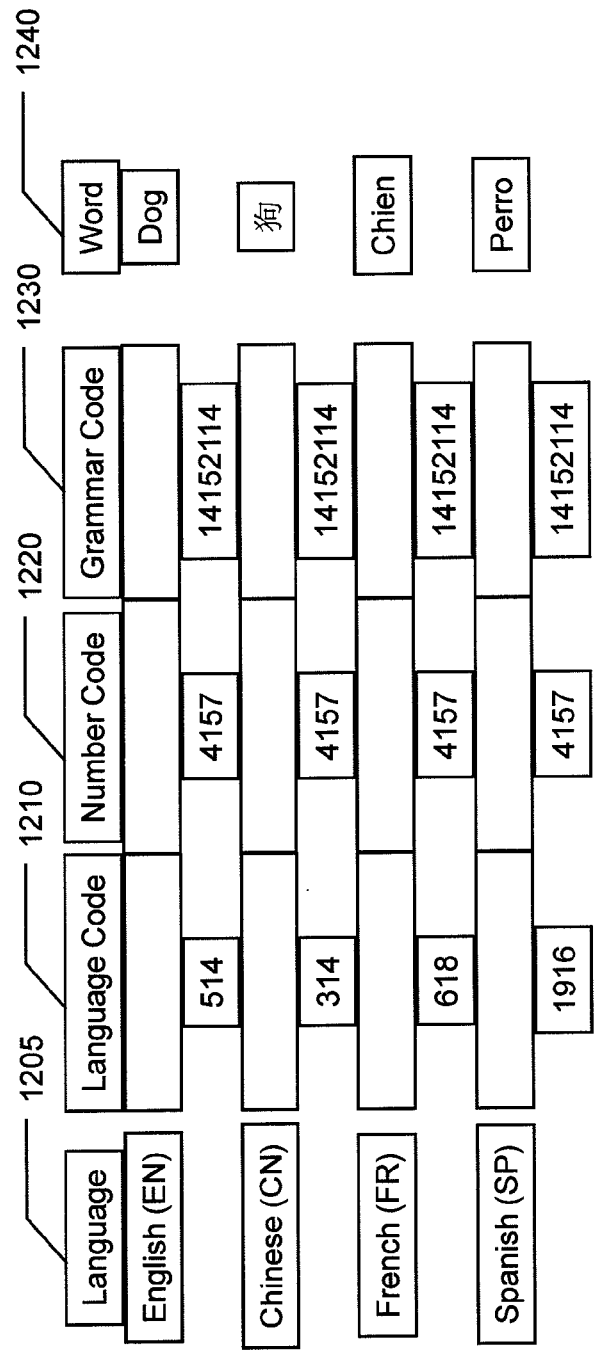
Figure 12B
Figure 12C

COMMUNICATION DEVICE FOR MULTIPLE LANGUAGE TRANSLATION SYSTEM

BACKGROUND OF THE INVENTION

1. Field of the Invention

The present invention relates to communication devices. More specifically, the present invention discloses an electronic device for communicating between users of a multiple language translation system providing translation from a first language into at least one target language.

2. Description of the Prior Art

Since people throughout the world use various languages it is difficult for many people to communicate with each other unless they both know a common language. This leads to misunderstandings, conflicts, or isolation due to the language barrier.

In order to obtain better communication a human translator is often required to translate between two languages so that both parties can comprehend. However, employing a human translator can be expensive, ineffective, or inflexible.

Another common option for translation is using a computer for machine translation. Unfortunately, language rules in various languages can differ greatly. As a result the output from the machine translation is often incomprehensible rendering the method unreliable.

Therefore, there is need for an improved communication device that provides an improved means of effectively and conveniently translating between user languages.

SUMMARY OF THE INVENTION

To achieve these and other advantages and in order to overcome the disadvantages of the conventional methods in accordance with the purpose of the invention as embodied and broadly described herein, the present invention provides an electronic communication device for a multiple language translation system that allows users to communicate with others using their own preferred language and the communication device provides a translation for each user in their preferred language.

The communication device comprises operation switches that provide control over various operations performed by the communication device. The operation switch comprises, for example, status switch, mode switch, volume switch, microphone switch, detect/select switch, language switch, on/off switch, record switch, camera mode switch, camera control switch, and interrupt request Signal indicators are provided that visually indicates the current status of the communication device that the operation switch has selected. The signal indicator is, for example, a light emitting diode (LED) that illuminates in a color or a multi-color LED that changes color, or an LED that flashes in a pattern to indicate the current status of the communication device.

A main housing provides a body for the communication device 1300 and holds the electrical components, modules, and circuitry utilized for operation of the communication device 1300. The electronics comprise, for example, a wireless receiver and transmitter, an audio processing module for controlling received audio and transmitted audio, a central processing unit, memory, programmable memory (for firmware, operating system, translation database), voice synthesizer for simulating spoken language, battery, switches, indicators, etc.

The communication device of the present invention comprises a wireless transceiver for connecting and communicating with other users, devices, networks, and the Internet.

An earphone and a microphone are provided to allow a user to hear audible communication or translations from other users and speak in order to communicate using their voice. A display is provided for displaying text, translations, communication, images, or video.

The communication device further comprises a camera that allows video or image data to be captured by the communication device. The camera also allows the communication device to operate like a scanner and capture pictures, images, and text which can then be processed. Additionally, utilizing the camera and the multiple language translation system of the present invention the user can look at text in one language and receive the translation of the text in their chosen language.

A remote control comprising a plurality of operation switches and a plurality of signal indicators allows a user to easily setup, alter the settings, or control the operation of the communication device. Utilizing the operation switches on the remote control a user has control over the various settings, options, and operations that the communication device has or is capable of performing.

The communication device for the multiple language translation system of the present invention receives an input from a first user in an original language. Next, the original language input is translated into text in a base language. The base language text is then converted into word code or word codes of a target language and the target language word or words are determined. The target language words are searched for over the Internet or a server and the most popular, best choice, or most likely use translation is selected and sent to a user as a translation in the target language.

Another application of the communication device for the multiple language translation system is in a telephone conversation or conference call. Each member of the conversation uses their native language and the translation is supplied to other users in their respective native language. This allows callers to use a language they are familiar with in order to hold a conversation with users of different languages.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 1A is a drawing illustrating a code stream of the multiple language translation system of the present invention according to an embodiment of the present invention;

FIGS. 1B-1C are drawings illustrating a word code structure of the multiple language translation system of the present invention according to an embodiment of the present invention;

FIG. 1D is a drawing illustrating a code stream of the multiple language translation system of the present invention according to an embodiment of the present invention;

FIG. 1E is a drawing illustrating relationships in word codes using multiple languages of the multiple language translation system according to an embodiment of the present invention;

FIG. 12A is a drawing illustrating a letter code system where letters in a base language are represented by numbers according to an embodiment of the present invention;

FIG. 12B is a drawing illustrating format of a word code according to an embodiment of the present invention;

FIG. 12C is a drawing illustrating a comparison of word codes for different languages according to an embodiment of the present invention;

DESCRIPTION OF THE PREFERRED EMBODIMENTS

Figure 2A:
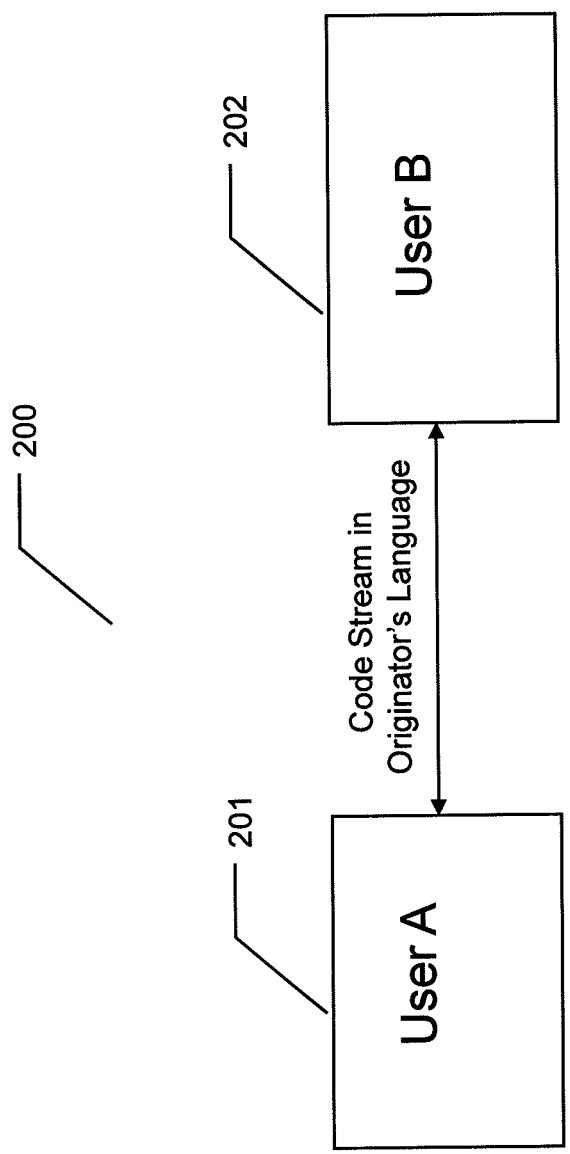
FIG. 2A is a drawing illustrating architecture of the multiple language translation system of the present invention according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Figure 13A:
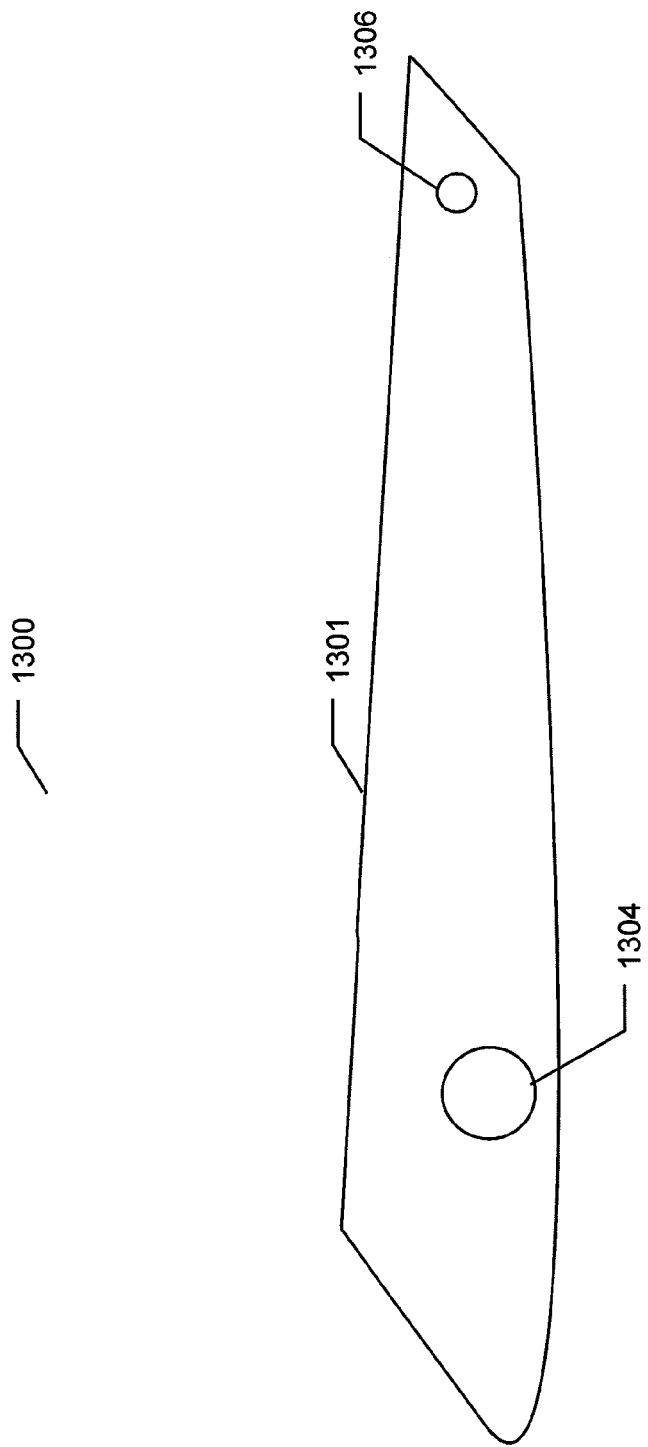
FIGS. 13A-13D are side view drawings illustrating a communication device for a multiple language translation system according to embodiments of the present invention.

Refer to FIG. 13A, which is a side view drawing illustrating a communication device for a multiple language translation system according to an embodiment of the present invention.

As shown in FIG. 13A the communication device 1300 comprises a main housing 1301, a status switch 1304, and a signal indicator 1306.

The status switch 1304 allows a user to switch between various status or availability modes. The status switch 1304 in this embodiment is an operation switch that has been preset or programmed to operate as a status switch. Such availability or status modes are, for example, available, offline, online, unavailable, busy, shut down, translating mode for all languages, receiving mode but not submitting mode, or connecting. When a user does not want to be disturbed the status switch 1304 is used to set the communication device 1300 into unavailable mode. If the user presses the status switch 1304 to enter offline status the communication module of the communication device 1300 is turned off or put in standby and the communication device 1300 cannot be connected to another device.

The signal indicator 1306 visually indicates the current status of the communication device 1300 that the status switch 1304 has selected. The signal indicator is, for example, a light emitting diode (LED) that illuminates in a color or a multi-color LED that changes color, or an LED that flashes in a pattern to indicate the current status of the communication device 1300. For example, if a user is currently in a conversation or in communication with another user or users the signal indicator 1306 will indicate that the user is busy. As a result, other users can easily see the status of the user's communication device 1300.

The signal indicator 1306 identifies the status of the communication device 1300 by emitting, for example, a green light representing the communication device 1300 is in translation mode for all languages, a red light for offline mode, a yellow light to indicate the communication device 1300 is in receiving mode but not transmitting mode, etc. The signal indicator 1306 can also utilize flashing lights or patterns to indicate status modes. For example, the signal indicator is turned off for offline mode, a slow blinking light for busy, and a non-blinking on light for available.

The signal indicator 1306 provides the ability to show which users or group of users are connected together.

The signal indicator 1306 also provides the ability to show which user is currently talking or communicating.

The signal indicator 1306 also provides the ability to show which language a user is using.

The main housing 1301 provides a body for the communication device 1300 and holds the electrical components, modules, and circuitry utilized for operation of the communication device 1300. The electronics comprise, for example, a wireless receiver and transmitter, an audio processing module for controlling received audio and transmitted audio, a central processing unit, memory, programmable memory (for firmware, operating system, translation database), voice synthesizer for simulating spoken language, battery, switches, indicators, etc.

The wireless receiver and transmitter comprises, for example, a Bluetooth transceiver, a wi-fi transceiver, a 3G transceiver, a 4G transceiver, or a combination of these transceivers. The wireless receiver and transmitter provides connectivity between users, devices, the Internet, or networks. For example, the communication device 1300 comprises a Bluetooth transceiver for connecting to other user's devices and a wi-fi transceiver for connecting to the Internet. While a user is communicating with other users the user's via the Bluetooth transceiver the same user's communication device 1300 is accessing the Internet via the wi-fi transceiver.

Figure 13B:
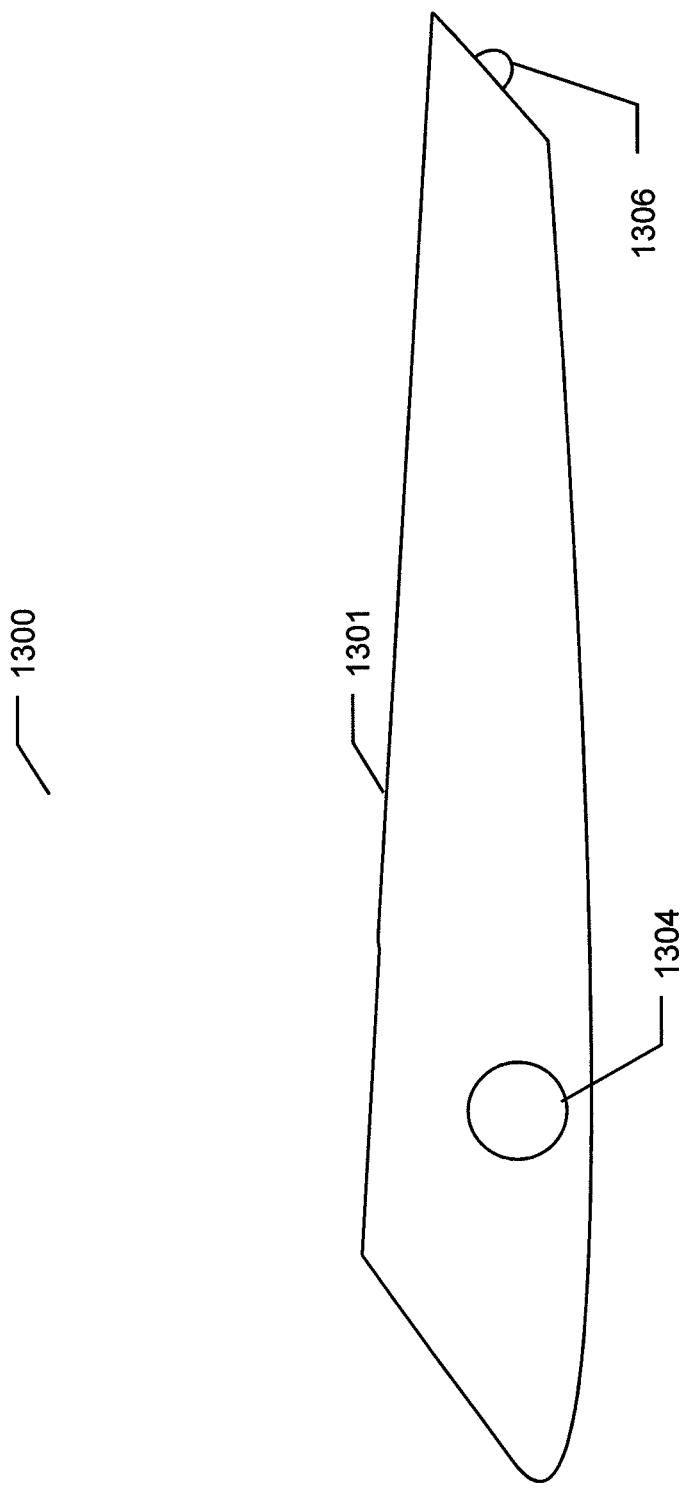

Refer to FIG. 13B, which is a side view drawing illustrating a communication device for a multiple language translation system according to an embodiment of the present invention.

In this embodiment signal indicator 1306 is disposed on the front of the communication device 1300. The forward facing position of the signal indicator 1306 allows for improved visibility of the light as other users can see the signal indicator 1306 from the front rather than just one side of the communication device 1300.

Figure 13C:
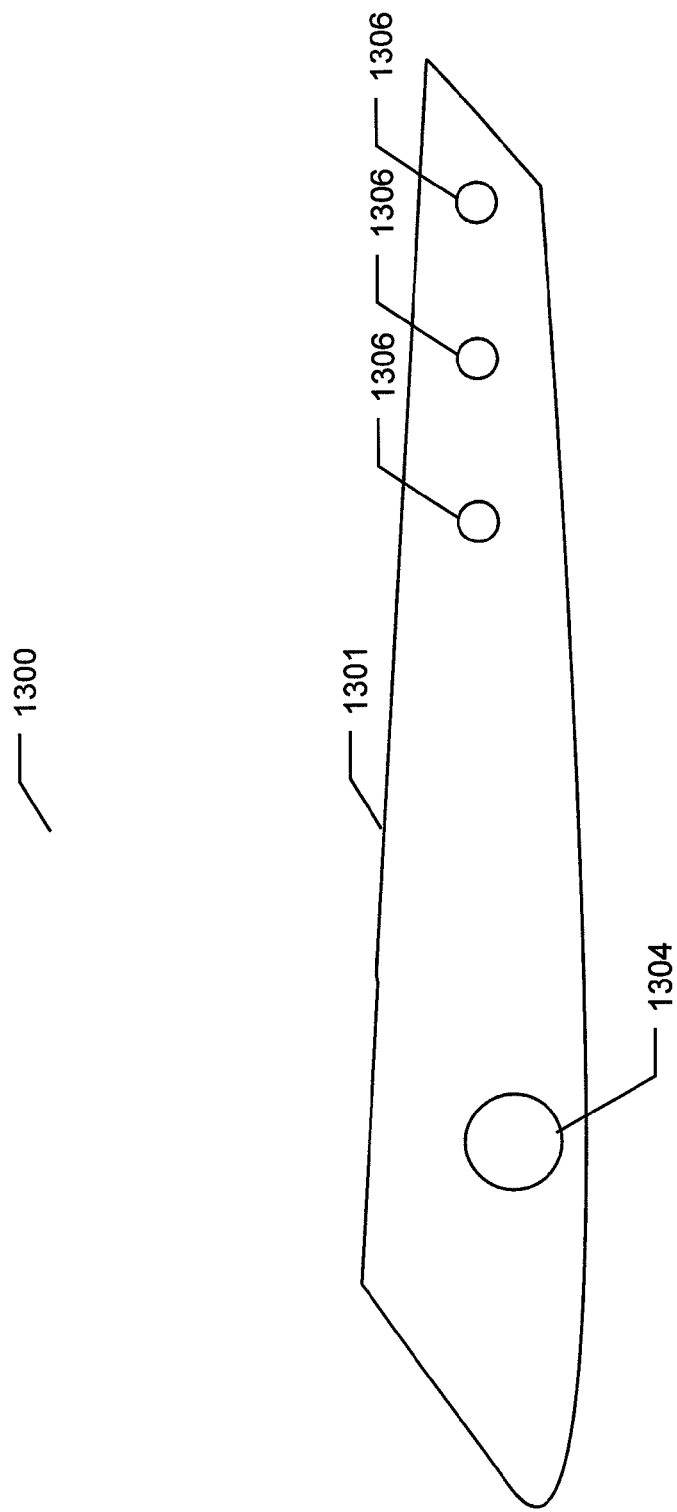

Refer to FIG. 13C, which is a side view drawing illustrating a communication device for a multiple language translation system according to an embodiment of the present invention.

In the embodiment illustrated in FIG. 13C the communication device 1300 comprises a plurality of signal indicators 1306. Utilizing a plurality of signal indicators 1306 allows greater flexibility in providing information via the signal indicators 1306. For example, signal indicators 1306 can be dedicated to provide various status, mode, or condition information or a combination of signal indicators 1306 can be used to provide information. For example, one signal indicator 1306 provides status information, one signal indicator 1306 provides mode information, and one signal indicator provides operational condition information. For example, one signal indicator 1306 indicates if the user is busy, available, or offline, one signal indicator 1306 indicates the user is in receive mode only, receive and transmit mode, or transmit mode only, and one signal indicator 1306 indicates the user is connecting or requesting to communicate.

In embodiments of the present invention the plurality of signal indicators 1306 are positioned on the front of the communication device 1300 or positioned in a combination of on the front and the side of the communication device 1300.

Figure 13D:
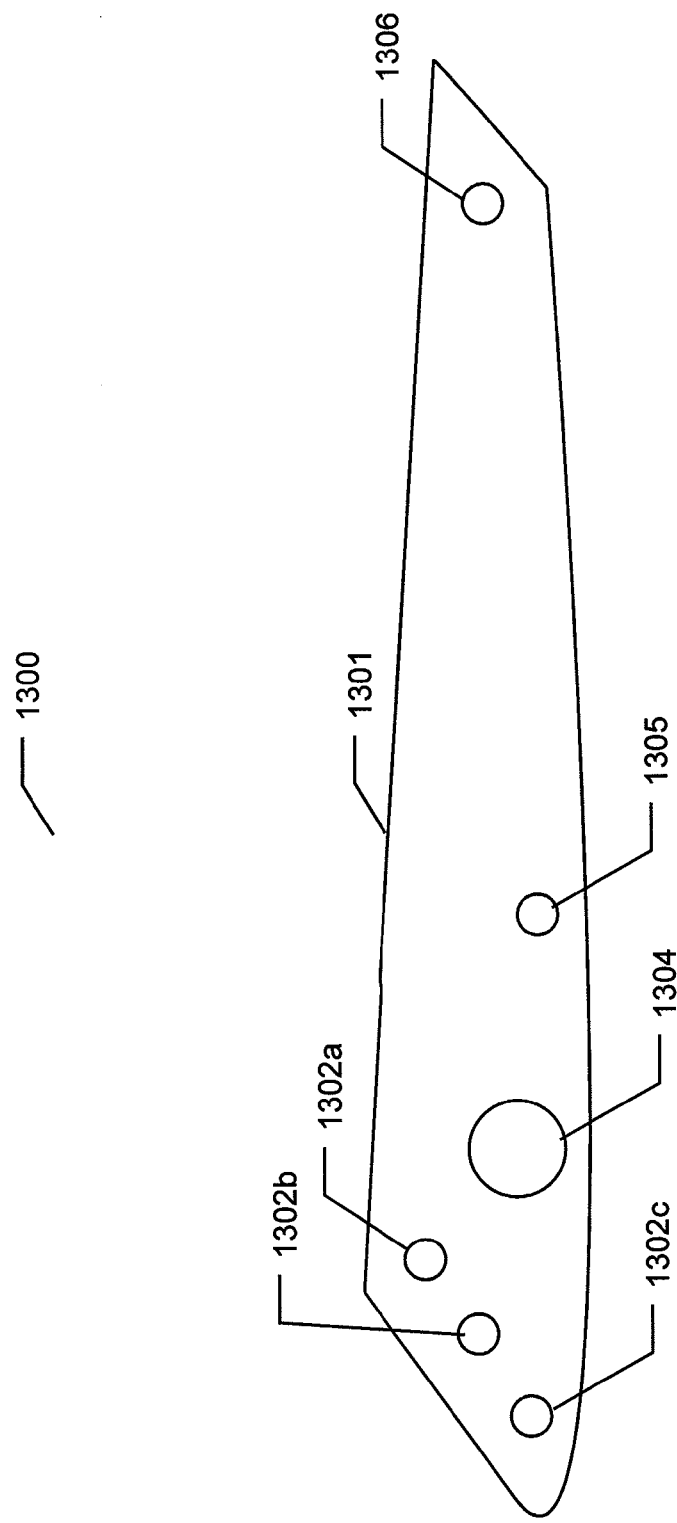

Refer to FIG. 13D, which is a side view drawing illustrating a communication device for a multiple language translation system according to an embodiment of the present invention.

In the embodiment illustrated in FIG. 13D, the communication device 1300 further comprises a detect/select switch 1305 and a plurality of language switches 1302a,1302b, 1302c.

The detect/select switch 1305 allows a user to scan or detect available devices, connections, users, or networks. The detect/select switch 1305 also allows a user to connect or request connection from available devices, connections, users, or networks.

In an embodiment of the present invention the communication device 1300 can be set to automatically scan for available devices and/or automatically connect to available devices. In an embodiment of the present invention the communication device 1300 utilizes proximity detect/select mode so that only available devices in close proximity to the user are available for connection.

In the embodiment illustrated in FIG. 13D the detect/select 1305 is utilized to detect and select available devices. For example, when two or more users want to make a connection and communicate with each other the users simultaneous depress the detect/select switch 1305 for a short period of time and the users are connected with each other. In another example, if a user wants to enter a conversation or discussion already in progress the user depresses the detect/select switch 1305 and the communication device 1300 detects the devices or hub device in the conversation and connects the user's communication device 1300 with the current group in the conversation. In another example, by repeatedly pressing or continually holding down the detect/select switch 1305 the user is able to cycle through the available devices and select which device or devices to connect with.

A plurality of language switches 1302a,1302b,1302c are provided for selecting different languages. While communicating it is common for words or phrases from different languages to be incorporated in a sentence of an original or base language. For example, if the user is currently or normally speaking in a first language and wants to incorporate a word or phrase from a second language, the user presses the appropriate language switch 1302a,1302b,1302c and the communication device 1300 can more easily adjust to use of the second language. Either by pressing another language switch 1302a,1302b,1302c, or by releasing the language switch 1302a,1302b,1302c, the communication device 1300 is signalled to a return to use of the first language. For example, if the user is using English and in the same sentence wants to use a word in Spanish the user can use the language switch associated with Spanish when the user uses the Spanish word. To return to using English the user releases the Spanish language switch if they have depressed the switch while using the Spanish word or presses the English language switch to return to using English.

The various languages associated with the language switches are selectable or programmable to increase flexibility.

Figure 13E:
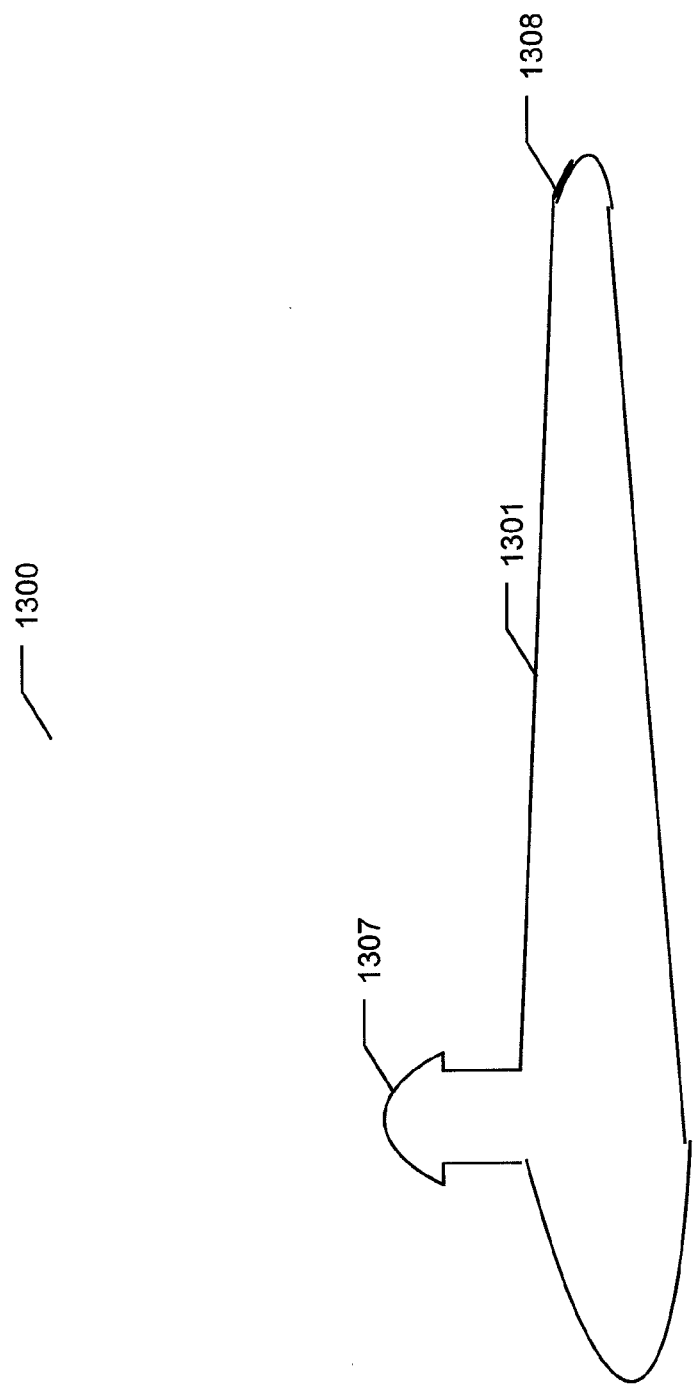
FIG. 13E is a top view drawing illustrating a communication device for a multiple language translation system according to an embodiment of the present invention.

Refer to FIG. 13E, which is a top view drawing illustrating a communication device for a multiple language translation system according to an embodiment of the present invention.

In the embodiment illustrated in FIG. 13E the communication device 1300 further comprises a microphone 1308 and an earphone 1307 connected to the main housing 1301.

The microphone 1308 allows a user to speak and the microphone captures the user's voice. The electronics inside the main housing 1301 process the audio input via the microphone 1308. The audio is wirelessly transmitted to connected devices as an audio signal, an encoded digital audio signal, or an encoded code stream.

The earphone 1307 when positioned by the user into their ear allows the user to hear audio received from connected devices.

Figure 14A:
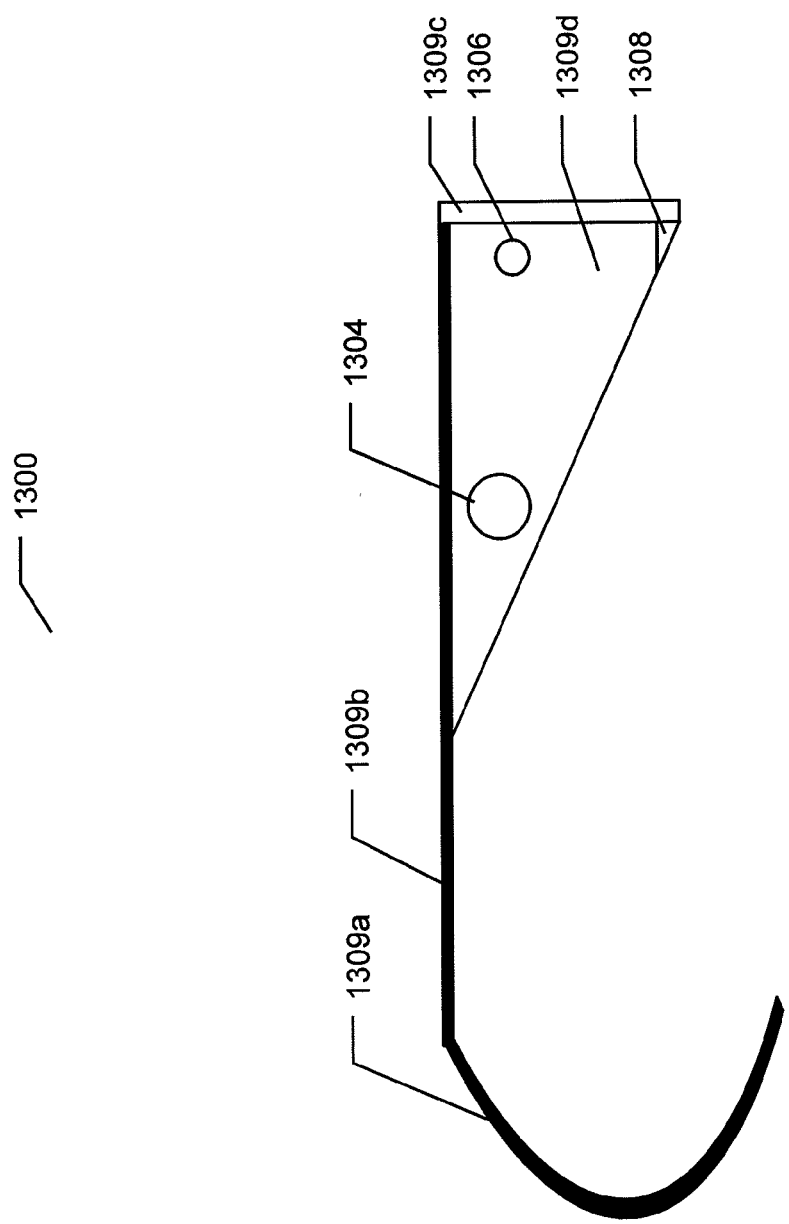
FIGS. 14A-14C are side view drawings illustrating a communication device for a multiple language translation system according to embodiments of the present invention.

Refer to FIG. 14A, which is a side view drawing illustrating a communication device for a multiple language translation system according to an embodiment of the present invention.

In the embodiment illustrated in FIG. 14A the communication device 1300 comprises a frame in a shape to allow the communication device 1300 to be worn like eyeglasses.

The communication device 1300 comprises an ear frame 1309a, a connecting frame 1309b, a display frame 1309c, a side module 1309d, a microphone 1308, a status switch 1304, and a signal indicator 1306.

The status switch 1304 and the signal indicator 1306 operate as describe in the embodiments of FIGS. 13A-13D. The side module 1309d is similar to the main housing 1301 of FIGS. 13A-13D in that the electronics to operate the communication device 1300 are disposed inside the side module 1309*d* or are partially exposed in the side module 1309*d* as the status switch 1304 and the signal indicator 1306 are.

When the user is wearing the communication device 1300 the ear frame 1309*a* extends around, extends partially around, or rests on the back of the user's ear.

The display frame 1309*c* holds a display, a lens, or clear glass.

The connecting frame 1309*b* connects the ear frame 1309*a* and the display frame 1309*c*.

A set of ear frames 1309*a*, connecting frames 1309*b*, and display frames 1309*c* is provide on the left and right side to form an eyeglass type frame set for the communication device 1300.

Figure 14B:
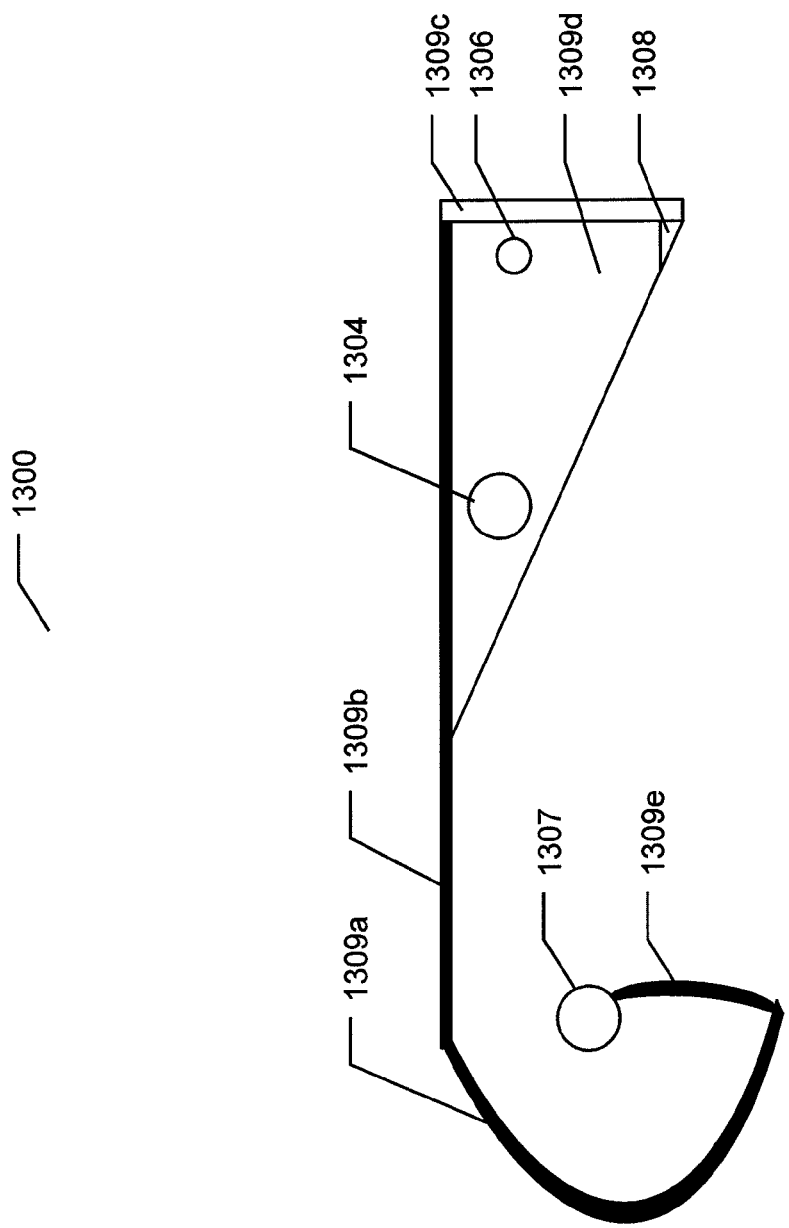

Refer to FIG. 14B, which is a side view drawing illustrating a communication device for a multiple language translation system according to an embodiment of the present invention.

In the embodiment illustrated in FIG. 14B the communication device 1300 further comprises an earphone 1307 and flexible earphone frame 1309*e*. The earphone 1307 allows the user to hear communication from other connected users.

The flexible earphone frame 1309*e* connects the earphone 1307 to the ear frame 1309*a* and allows the earphone 1307 to rest comfortable in the user's ear.

Electrical connection between the earphone 1307 and the electronics in the side module 1309*d* run inside the flexible earphone frame 1309*e*, the ear frame 1309*a*, and the connecting frame 1309*b*.

Figure 14C:
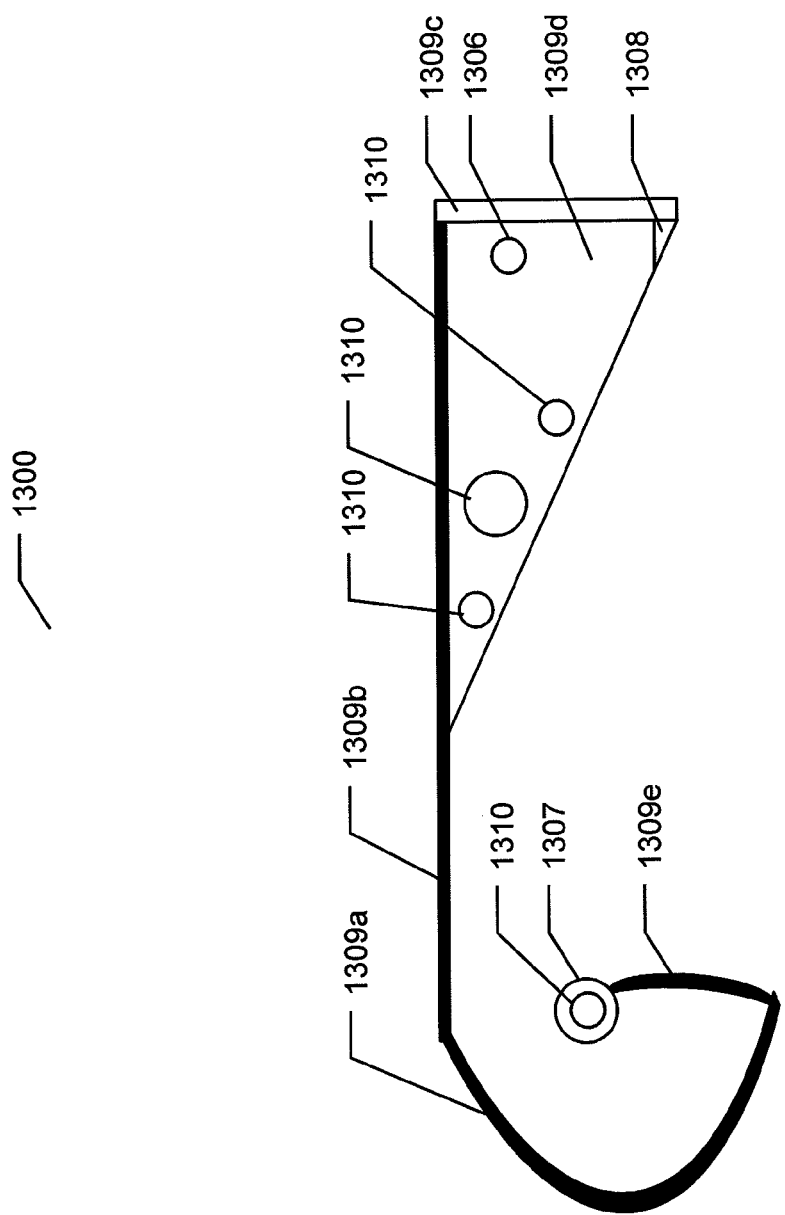

Refer to FIG. 14C, which is a side view drawing illustrating a communication device for a multiple language translation system according to an embodiment of the present invention.

In an embodiment of the present invention the communication device 1300 comprises a plurality of operation switches 1310.

The operation switches 1310 provide control over various operations performed by the communication device 1300.

The operation switches 1310 comprise, for example:
- status switch—allows a user to switch between various status or availability modes such as available, offline, online, unavailable, busy, shut down, translating mode for all languages, receiving mode but not submitting mode, or connecting;
- mode switch—for switching between modes such as universal broadcast mode (one user to many users), bidirectional mode (individual users communicate back and forth with main user), and omnidirectional mode (all users communicate with each other);
- volume switch—for controlling volume level for earphone;
- microphone switch—for controlling volume level of microphone;
- detect/select switch—for allowing a user to scan or detect available devices, connections, users, or networks and also allows a user to connect or request connection from available devices, connections, users, or networks;
- language switch—for selecting different languages or toggling between different languages;
- on/off switch—for turning the communication device on and off;
- record switch—for starting and stopping recording of a conversation (recording of original language, translation, or both) which is then stored in memory in the communication device;
- camera mode switch—for selecting operating mode of the camera such as scanning mode, image capture mode, video capture mode, handwriting recognition mode, optical code recognition mode, or immediate translation mode where the communication device provides a translation of text or image data that the camera is currently focused on;
- camera control switch—for selecting start and stop operation of the currently selected camera mode (for example, start video capture);
- display control switch—controlling display settings and remote control display settings; and
- interrupt request—for allowing a user to request communicating privilege at the next available opportunity. This prevents users from "talking over" each other as users submit a request to communicate and are individually granted privilege to speak when no other users are speaking or communicating.

In an embodiment of the present invention the current status of the operation switch 1310 is provided to the user. For example, an audible comment of the status is provided to the user via the earphone or a visual comment of the status is provided to the user via the display. This allows the user to easily confirm the current status of the operation switch 1310 or the status that is available or selectable.

For example, if the operation switch 1310 is a status switch, as the user switches between various status or availability modes an audible or visual comment will be provided such as "available" then "offline" then "online" then "unavailable" etc.

In an embodiment of the present invention the operating mode of the operation switch 1310 is programmable. The operation switch 1310 is programmable to operate as any one of the switch types described above. For example, an operation switch 1310 is programmed to perform the function of the language switch. Whenever the user interacts with this programmed operation switch, the switch operates as a language switch.

The function of the operation switch is programmed, for example, by a remote control device or an external device wirelessly connected to the communication device.

In an embodiment of the present invention the operating mode of the operation switch 1310 is preset. The operation switch 1310 operates as the preset switch type. For example, an operation switch 1310 is preset to perform the function of the status switch as illustrated in FIG. 13A. Whenever the user interacts with this preset operation switch, the switch will then operate as a status switch.

Figure 14D:
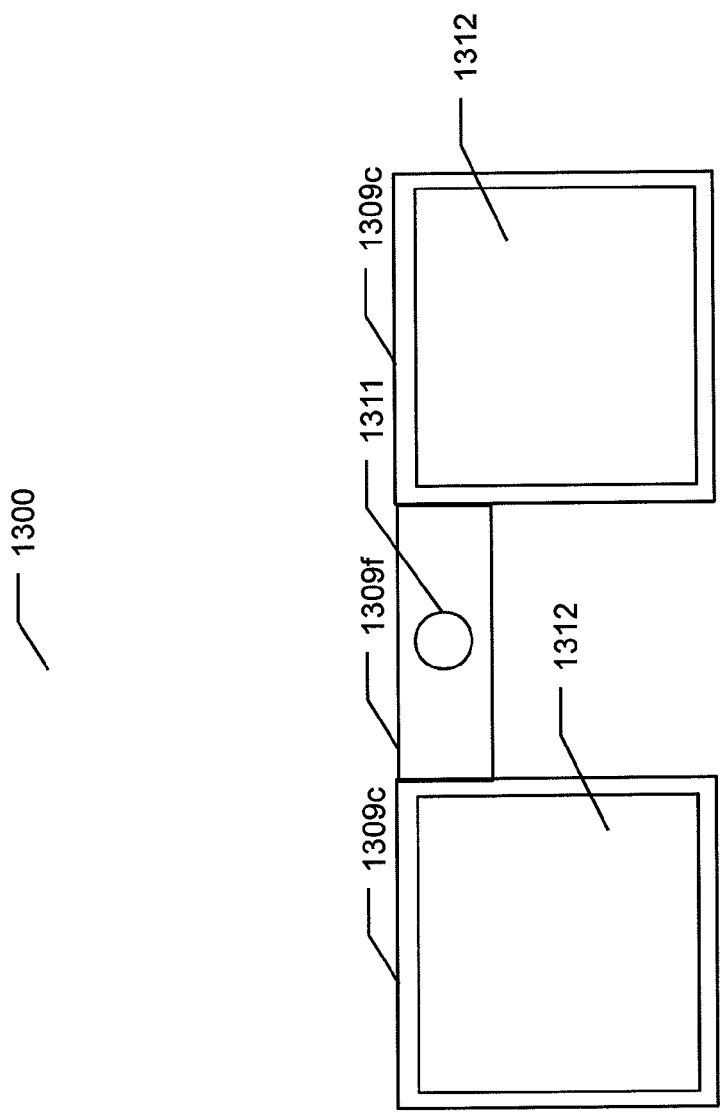
FIGS. 14D-14E are front view drawings illustrating a communication device for a multiple language translation system according to embodiments of the present invention.

Refer to FIG. 14D, which is a front view drawing illustrating a communication device for a multiple language translation system according to an embodiment of the present invention.

In the embodiment illustrated in FIG. 14D the communication device 1300 further comprises a bridge frame 1309*f* connecting the two display frames 1309*c*. The bridge frame 1309*f* allows the front of the communication device 1300 to rest comfortably on the bridge of the user's nose.

In an embodiment of the present invention the communication device 1300 further comprises a camera 1311 in the bridge frame 1309*f*. The camera 1311 allows video or image data to be captured by the communication device 1300. For example, the communication device 1300 captures image and video data of objects or action that the user is looking at.

The camera 1311 also allows the communication device 1300 to operate like a scanner and capture pictures, images, and text which can then be processed. For example, text can be scanned and then have an optical code recognition OCR process performed to convert the image data into text format.

Additionally, utilizing the camera 1311 and the multiple language translation system of the present invention the user can look at text in one language and receive the translation of the text in their chosen language.

Furthermore, utilizing handwriting recognition software with the camera 1311 allows the communication device 1300 to recognize text while the user is writing or after the user has written text and convert the handwritten text into text data. The recognition software with the camera 1311 also allows hand-drawn pictures or shapes to be recognized and converted into image data.

In an embodiment of the present invention a display 1312 is held by each of the display frames 1309c. The display 1312 allows visual information such as, for example, translation, conversation, or communication data. The design of the displays 1312 and resolutions allow the user to comfortably view visual information while wearing the communication device 1300. The displays 1312 also eliminate the need for an external display. The displays 1312 further allow hearing impaired users to participate in communication as they can see the communication on the display and don't need to hear the communication.

In an embodiment of the present invention only one display 1312 is utilized and the other display frame 1309c holds a lens or clear glass material.

In an embodiment of the present invention the two display frames 1309c hold two lens or two clear glass materials.

In an embodiment of the present invention the two display frames 1309c hold two pieces of opaque or semi-opaque material to eliminate light or reduce light for visually impaired or light sensitive users.

Figure 14E:
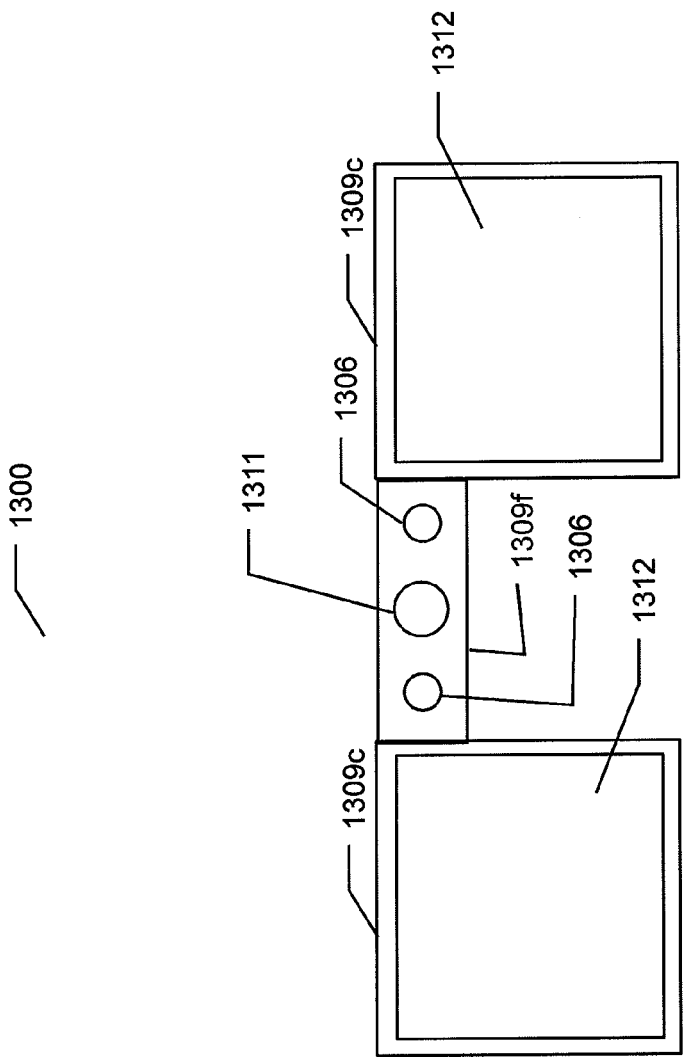

Refer to FIG. 14E, which is a front view drawing illustrating a communication device for a multiple language translation system according to an embodiment of the present invention.

In an embodiment of the present invention at least one signal indicator 1306 is provided in the bridge frame 1309f. This allows the communication device 1300 to provide visual information to other users from the front of the communication device 1300.

Figure 15A:
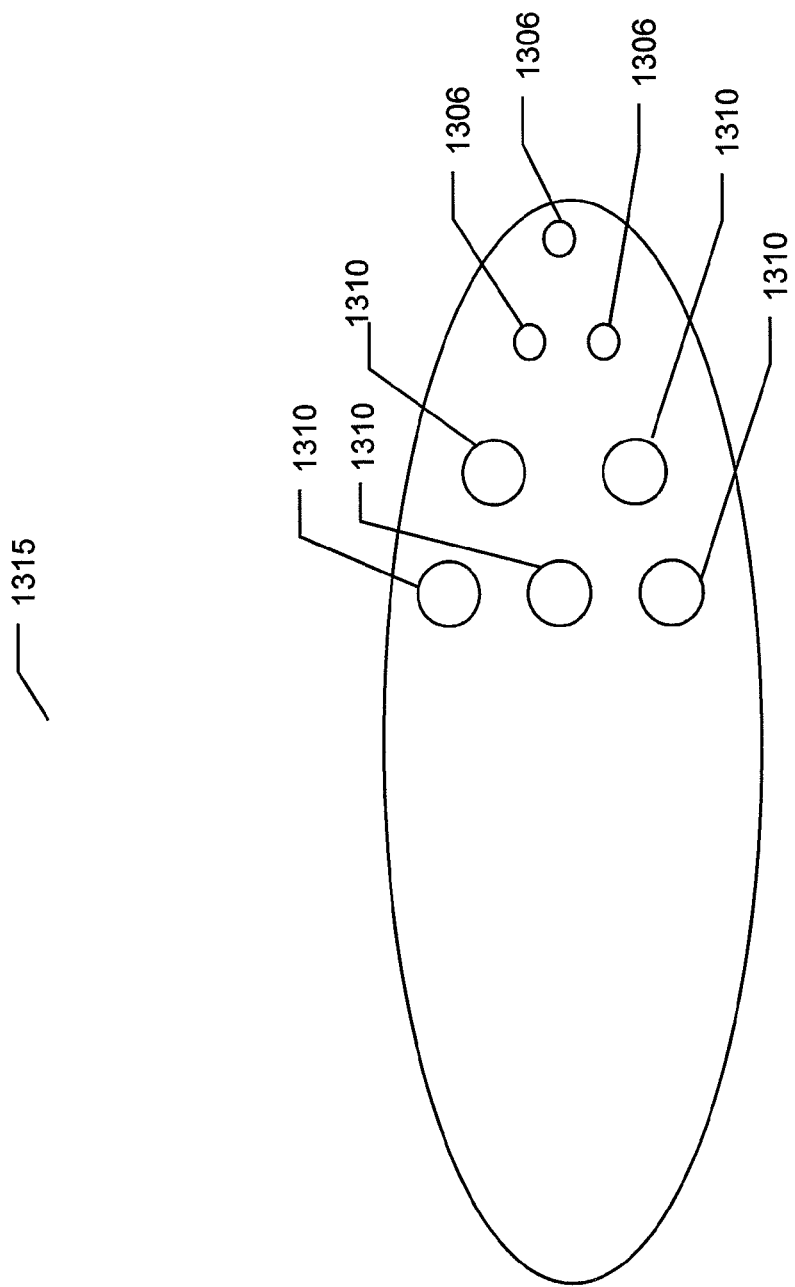
FIGS. 15A-15B are drawings illustrating a remote control of a communication device for a multiple language translation system according to embodiments of the present invention.

Refer to FIG. 15A, which is a drawing illustrating a remote control of a communication device for a multiple language translation system according to an embodiment of the present invention.

In an embodiment of the present invention the communication device further comprises a remote control 1315 for operating with the communication device.

The remote control 1315 comprises a plurality of operation switches 1310 and a plurality of signal indicators 1306. The remote control allows a user to easily setup, alter the settings, or control the operation of the communication device.

Utilizing the operation switches 1310 on the remote control 1315 a user has control over the various settings, options, and operations that the communication device has or is capable of performing.

Figure 15B:
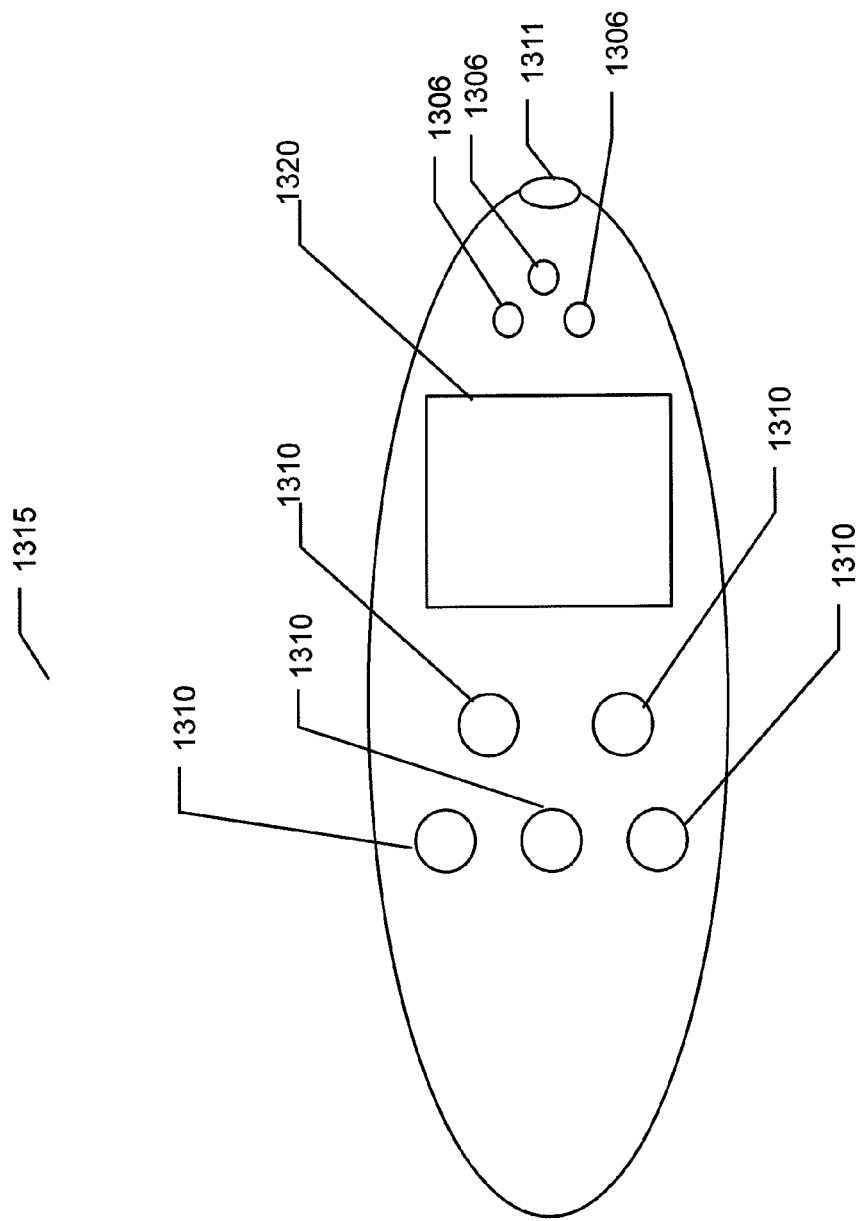

Refer to FIG. 15B, which is a drawing illustrating a remote control of a communication device for a multiple language translation system according to an embodiment of the present invention.

In the embodiment illustrated in FIG. 15B the remote control 1315 comprises a remote control display 1320, a camera 1311, a plurality of operation switches 1310, and a plurality of signal indicators 1306.

Utilizing the camera 1311 the remote control is capable of line-by-line scanning of text such as in a document as well as taking photographs or video and the remote control display 1320 provides a viewfinder and image/video display.

In an embodiment of the present invention the camera 1311 is positioned on the back of the remote control 1315 on the opposite side as the operation switches 1310 and the remote control display 1320. This allows the user to better view the remote control display 1320 while using the camera 1311.

The remote control display 1320 allows a user to see menus and options for setting up the communication device, options for setting or programming the function of the operation switches 1310 on the communication device or the remote control 1315, controlling function of the signal indicators 1306, viewing pictures, images, video, and text, act as a viewfinder for the camera 1311, and view communication and translations.

In an embodiment of the present invention the communication device receives a vocal, text, or graphical input from a user. The input is converted to a coding/signal system. The coding is translated word by word and then the present invention proceeds with cloud computing and searching. The best answer is received and reconfirm with the prime language input. Then the best answer is provided to the user as an audible translation via the earphone or as a visual translation via the display.

For better understanding of the communication device of the present invention a detailed description of the multiple language translation system in which the communication device is utilized is provided.

Refer to FIG. 1A, which is a drawing illustrating a code stream of the multiple language translation system of the present invention according to an embodiment of the present invention.

An important component of the multiple language translation system of the present invention is the code stream. As shown in FIG. 1A the code stream 100 comprises a number of elements. In this embodiment the code stream 100 comprises a language code 101, a first word code 102, a second word code 103, a third word code 104, and a sentence code 105.

The language code 101 comprises a code indicating or representing the language used in the word codes 102,103, 104 and the sentence code 105. For example, if the user generating the code stream 100 is using English, the language code 101 would indicate that the word codes 102,103,104 represent English words.

The word codes 102,103,104 are codes indicating or representing a word in the language that the language code 101 represents. Each word code represents a unique word.

The sentence code 105 is a code indicating a sentence structure for the word codes 102,103,104 in the code stream 100. During translation of the code stream 100, the sentence code 105 is used to format the word codes into a correct sentence.

In embodiments of the present invention the position of the various codes in the code stream is different. For example, the sentence code is positioned or located in the code stream ahead of the word codes.

Refer to FIGS. 1B-1C, which are drawings illustrating a word code structure of the multiple language translation system of the present invention according to an embodiment of the present invention.

In the embodiment shown in FIGS. 1B and 1C each word code 102 comprises a grammar code 102A and a number code 102B. The number code 102B is a code representing a unique word in the language used. The grammar code 102A is a code representing the grammatical usage or grammatical characteristic of the word. For example, if the language code indicates the language used is English, and the number code represents the word "Rabbit", the grammar code would represent "Noun".

Another example is given as follows:

For the word "She" the grammar code for "Pronoun" could be "123" and the number code representing "She" could be "45";

For the word "He" the grammar code for "Pronoun" could be "123" and the number code representing "He" could be "46";

For the word "We" the grammar code for "Pronoun" could be "123" and the number code representing "We" could be "47".

Note in this example the grammar code in the three word codes is the same since the three words are all pronouns. However, each number code represents a unique word since the three words are different. Similarly, when a word has multiple grammatical uses the number code does not change but the grammar code changes. For example, the word "fly" can be a verb or a noun with the same spelling. Therefore the number code does not change but the grammar code changes.

Additionally, in cases where words are spelled the same and the grammatical usage of the words is the same, the number code further identifies the correct word. For example, the word "runs" could mean "to jog quickly", "to operate", "paint drips", and "run for office". As these are all verbs and the spelling is the same, the number code is different for each meaning.

As shown in FIGS. 1B and 1C the position in the word code 102 of the grammar code 102A and the number code 102B in various embodiments is different.

Refer to FIG. 1D, which is a drawing illustrating a code stream of the multiple language translation system of the present invention according to an embodiment of the present invention.

In the embodiment shown in FIG. 1D the code stream 100 further comprises a user code 106 and a device code 107. In an embodiment of the present invention the device code 107 indicates or identifies the device sending the code stream. In another embodiment of the present invention the device code 107 indicates or identifies the device intended to receive the code stream. In an embodiment of the present invention the user code 106 indicates or identifies the user sending the code stream. In another embodiment of the present invention the user code 106 indicates or identifies the user intended to receive the code stream. In some embodiments of the present invention only one, either the user code 106 or the device code 107, is used.

In another embodiment the user code 106 represents the language of the intended receiver. In this embodiment the user code represents the receiver's language and the language code represents the language used in the code stream.

Refer to FIG. 1E, which is a drawing illustrating relationships in word codes using multiple languages of the multiple language translation system according to an embodiment of the present invention.

In FIG. 1E three languages are shown along with example language codes and word codes. The language code representing language 1 is "01", the language code representing language 2 is "02", and the language code representing language 3 is "03".

The number code in the word code for language 1 is "123". The number code in the word code for language 2 is also "123" since it matches or is a directly relating word in both language 1 and language 2. However, the number code for language 3 is "124" since the word in language 3 is a slightly different word due to, for example, nuance, meaning, usage, grammar, or sentence structure.

The grammar code in the word code for language 1 and language 3 is "45" since the grammatical usage of the word matches or directly relates in both languages. However, the grammar code for language 2 is "46" since the grammatical usage is different from language 1. For example, the word may be a verb in all three languages, but the verb type is different in language 2.

Refer to FIG. 2A, which is a drawing illustrating an architecture of the multiple language translation system of the present invention according to an embodiment of the present invention.

In the embodiment illustrated in FIG. 2A the architecture 200 of the multiple language translation system comprises a User A device 201 and a User B device 202. the User A device 201 and the User B device 202 comprise, for example, computers, mobile telephones, headsets, loudspeakers, or other electronic devices capable of transmitting or receiving analog or digital signals. In an embodiment of the present invention the communication link between User A device and User B device is unidirectional. In another embodiment the communication link is bidirectional to allow both users to communicate with each other.

In the embodiment illustrated in FIG. 2A the code stream is sent in the originator's language. In this embodiment translation of the code stream is performed by the receiving device. This allows one code stream to be sent to multiple user devices and the code stream is translated into the receiving user's preferred language.

As an example, the following is given:

User A transmits the following sentence encoded in a code stream. The original sentence is "gen wo hwei jia". The language used is Chinese and is indicated by the language code "05". The word codes are "22" (gen), "33" (wo), "44" (hwei), and "55" (jia). The sentence code is "66". Therefore, the original code stream would comprise "05+22+33+44+55+66".

User B receives the original code stream and detects the language code "05". User's B device then translates the word codes from Chinese into User B's preferred language, for example, English. The word codes "22+33+44+55" in Chinese become the following word codes in English "26" (with), "36" (me), "46" (come), and "56" (home). Obviously, "with me come home" is not correct. User B's device converts the sentence code "66" in the original code screen and formats the translated words into the grammatically correct sentence "come home with me".

Figure 2B:
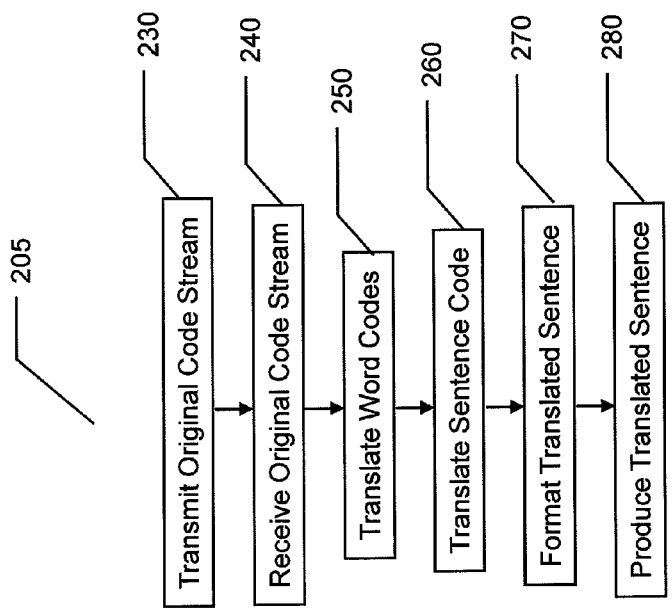
FIGS. 2B-2C are flowcharts illustrating methods of the multiple language translation system of the present invention according to an embodiment of the present invention.

Refer to FIG. 2B, which is a flowchart illustrating a method of the multiple language translation system of the present invention according to an embodiment of the present invention.

The method 205 is an embodiment utilizing the architecture illustrated in FIG. 2A. The method 205 begins by transmitting the original code stream created by a user (User A or User B) in Step 230. In Step 240 the other user receives the original code stream. Then, in Step 250 the user's device translates the word codes in the code stream into the language preferred by the receiving user. The user's device also translates the sentence code in the code stream in Step 260. Next, using the translated sentence code, the user's device formats the translated word codes into a grammatically correct sentence in Step 270. Finally, in Step 280 the translated sentence is provided to the receiving user. In an embodiment of the present invention the translated sentence is provided in audio. In another embodiment of the present invention the translated sentence is provided in text.

As a result, User A and User B can communicate in their own language utilizing the multiple language translation system of the present invention.

Figure 2C:
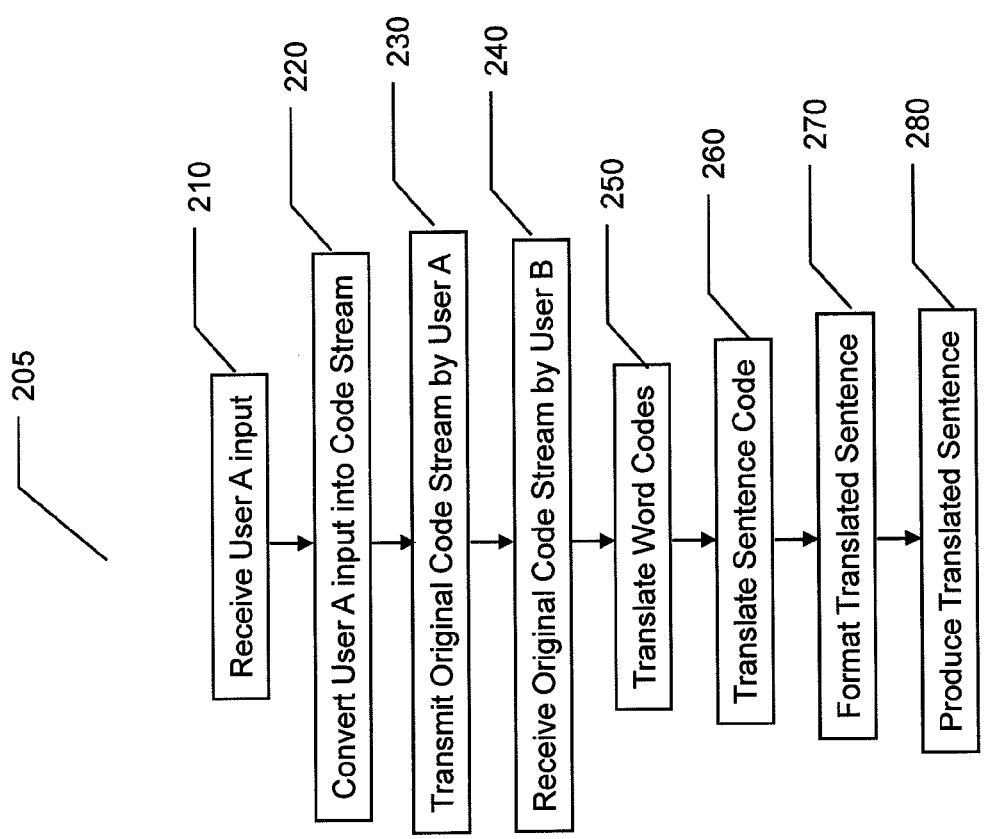

Refer to FIG. 2C, which is a flowchart illustrating a method of the multiple language translation system of the present invention according to an embodiment of the present invention.

The method 205 illustrated in FIG. 2C is similar to the method in FIG. 2B. However, in this embodiment prior to transmitting the original code stream in Step 230 the method begins in Step 210 by receiving the originating user's input (in this example User A). User A's device, in Step 220 converts or encodes the input into an original code stream. The method continues with the steps described regarding FIG. 2B.

In an embodiment of the present invention the user's input is an audio input. In another embodiment the user's input is text input on a keyboard.

Figure 3A:
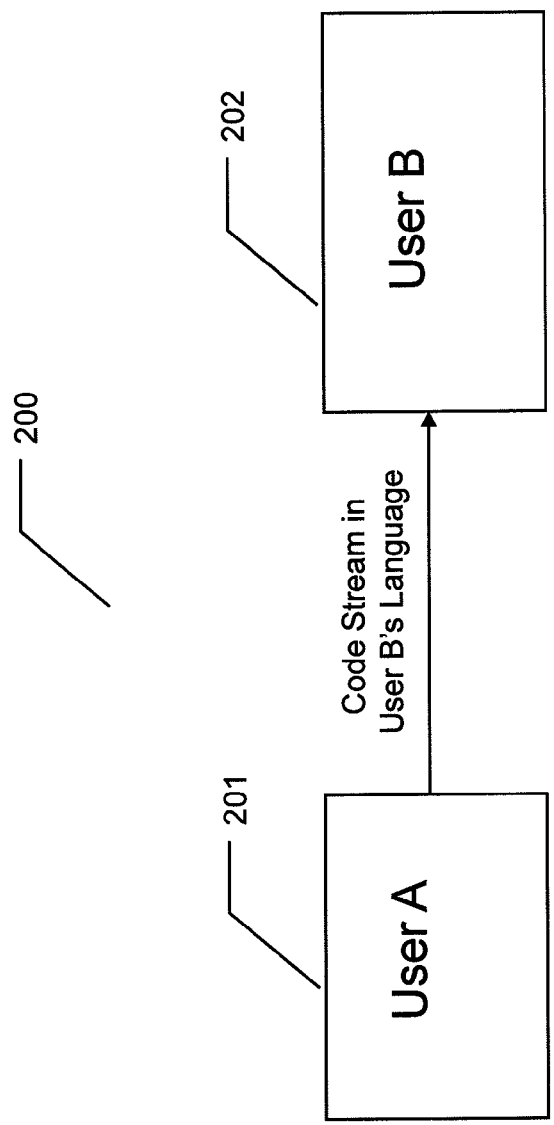
FIG. 3A is a drawing illustrating an architecture of the multiple language translation system of the present invention according to an embodiment of the present invention.

Refer to FIG. 3A, which is a drawing illustrating an architecture of the multiple language translation system of the present invention according to an embodiment of the present invention.

The architecture illustrated in FIG. 3A is similar to FIG. 2A but in this embodiment the code stream is transmitted in the receiving user's language. In FIG. 3A the receiving user is User B 202. However, the receiving user can be User A 201 if User B 202 is transmitting.

In this embodiment translating the input into the receiver's language and encoding of the code stream is performed on the transmitting user's device. This allows for the transmitting device to be powerful and the receiving device to be relatively simple. For example, in a situation such as the United Nations where numerous translations need to be performed for a large number of people, the facility can provide a very powerful computer system to translate and encode the code stream for multiple languages and send the appropriate code stream to the numerous receivers in the appropriate language. This allows for the receiving devices to be relatively simple devices since the device only needs to decode the code stream using the word codes and the sentence code and does not need to translate the word codes in the code stream.

Figure 3B:
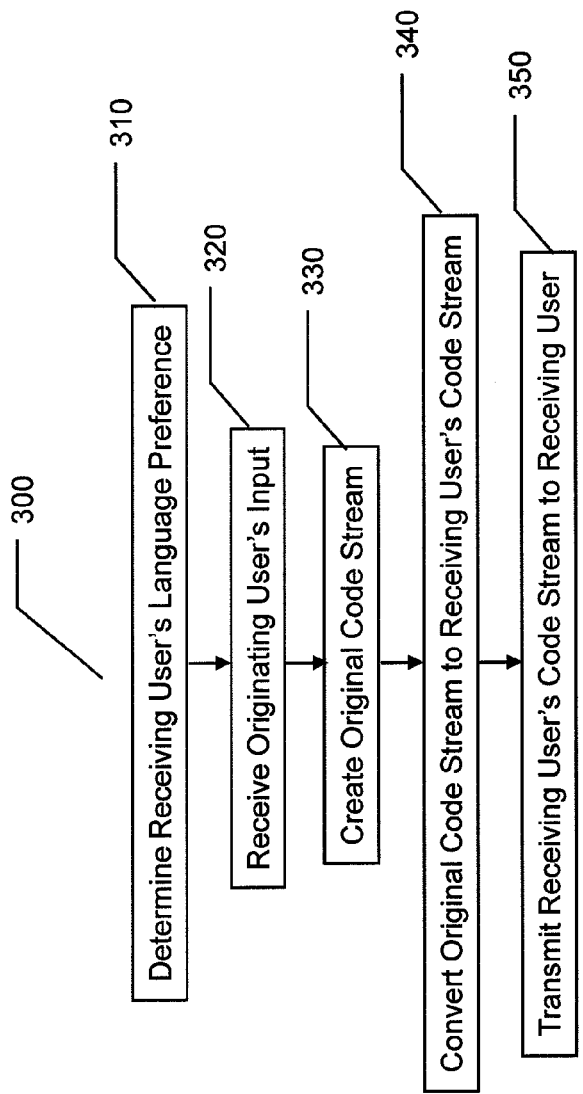
FIG. 3B is a flowchart illustrating a method of the multiple language translation system of the present invention according to an embodiment of the present invention.

Refer to FIG. 3B, which is a flowchart illustrating a method of the multiple language translation system of the present invention according to an embodiment of the present invention.

In the embodiment illustrated in FIG. 3B the method 300 begins by determining the receiving user's preferred language. This is performed by, for example, a preset user preference stored in the transmitting device, the receiving user sending their preference, or by reading the preference from the receiving device. Next, in Step 320 the transmitting device receives the originating user's input. Then the transmitting device creates an original code stream in the originating user's language in Step 330. In Step 340 the original code stream is converted into a receiving user's code stream in the receiving user's preferred language. Finally, the receiving user's code stream is transmitted to the receiving user in Step 350.

Figure 4A:
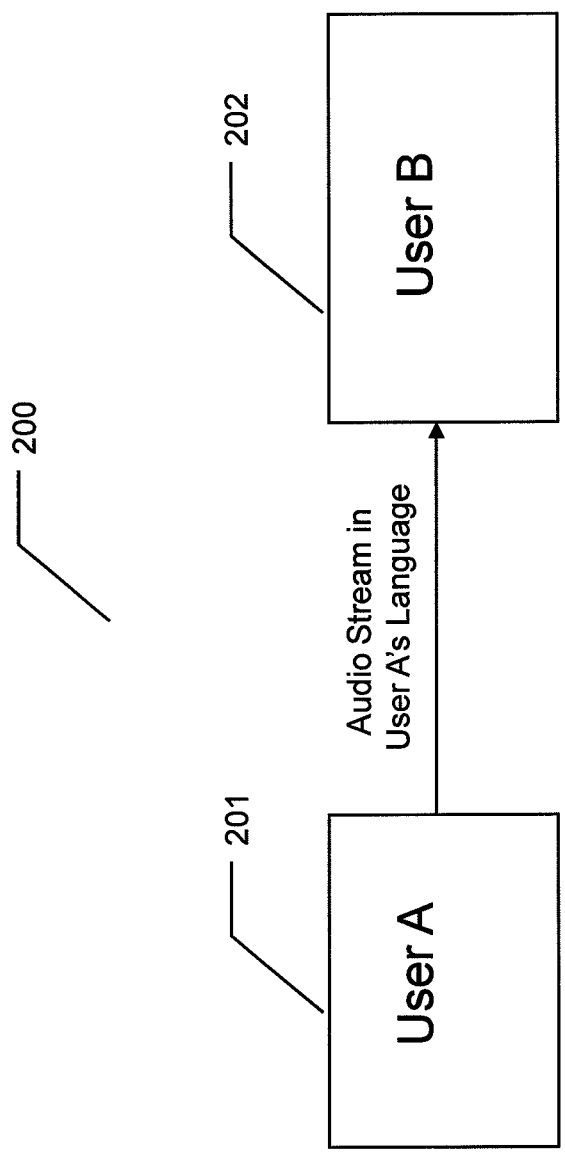
FIG. 4A is a drawing illustrating an architecture of the multiple language translation system of the present invention according to an embodiment of the present invention.

Refer to FIG. 4A, which is a drawing illustrating an architecture of the multiple language translation system of the present invention according to an embodiment of the present invention.

In the embodiment illustrated in FIG. 4A the architecture 200 is similar to FIG. 3A. However, in this embodiment instead of User A transmitting a code stream User A transmits an audio stream in User A's language to User B.

Figure 4B:
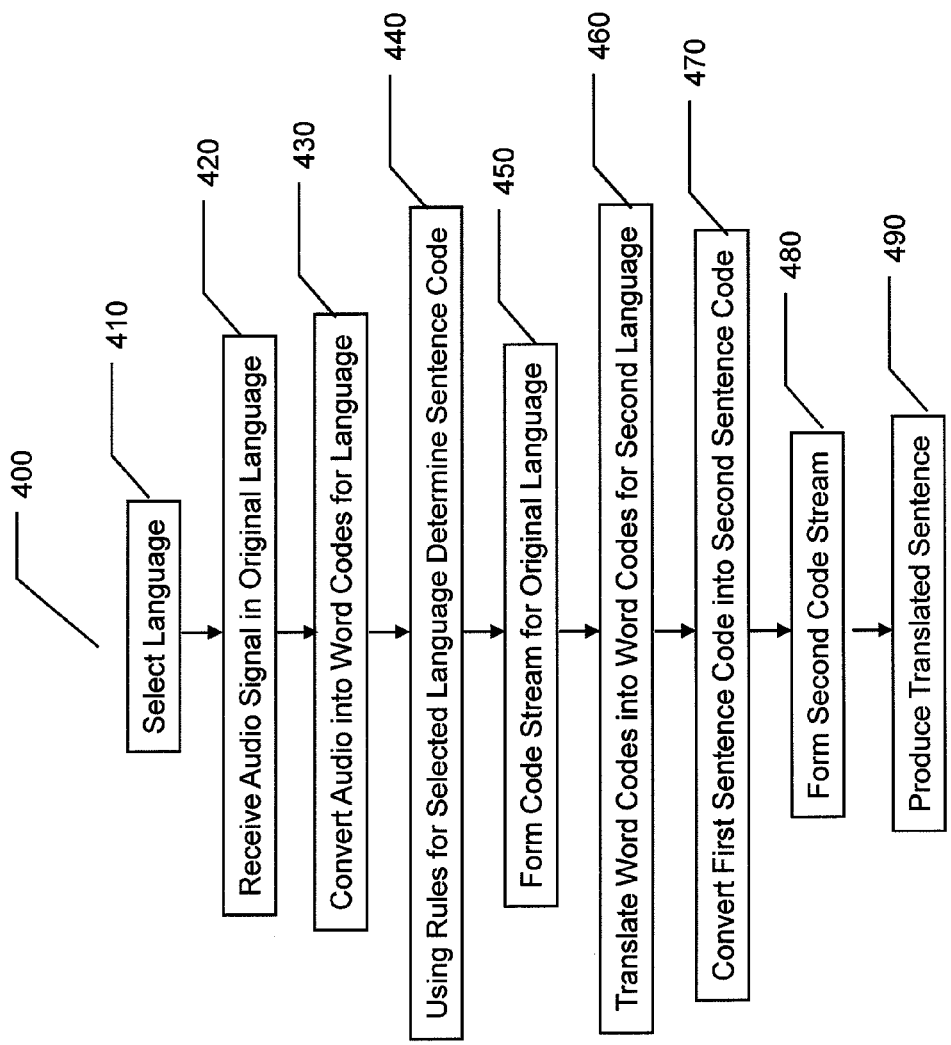
FIG. 4B is a flowchart illustrating a method of the multiple language translation system of the present invention according to an embodiment of the present invention.

Refer to FIG. 4B, which is a flowchart illustrating a method of the multiple language translation system of the present invention according to an embodiment of the present invention.

The method 400 begins in Step 410 with the receiving user selecting the language used by the transmitting user. In Step 420 the receiving user receives the audio stream from the transmitting user. The receiving user's device converts the audio stream into word codes for the selected language in Step 430. Then, is Step 440 a sentence code is determined using grammar rules for the selected language. A code stream is created comprising the language code, word codes, and sentence code for the selected language in Step 450. Next, in Step 460 the word codes in the code stream are translated into second word codes for the receiving user's language and in Step 470 the original sentence code is translated into a second sentence code. The second word codes, the second sentence code, and the language code for the receiving user's language are used to form a second code stream in 480. Finally, the translated sentence is produced in Step 490.

In an embodiment Step 490 is not utilized and the second code stream is preserved. In this embodiment the second code stream can be sent to another user, for example, such as a user using the same language in the code stream so that the code stream does not have to be translated again.

Figure 5A:
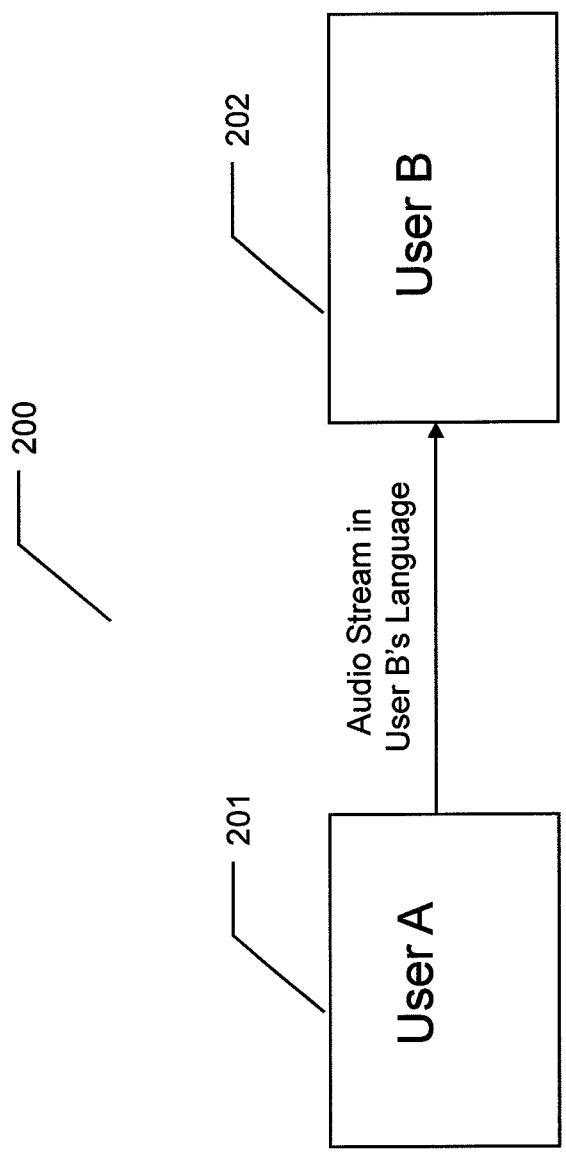
FIG. 5A is a drawing illustrating an architecture of the multiple language translation system of the present invention according to an embodiment of the present invention.

Refer to FIG. 5A, which is a drawing illustrating an architecture of the multiple language translation system of the present invention according to an embodiment of the present invention.

In the embodiment illustrated in FIG. 5A the architecture 200 is similar to FIG. 4A, however, in FIG. 5A an audio stream is transmitted in receiving user's language. In this embodiment User A's code stream is converted into an audio signal on User A's device.

Figure 5B:
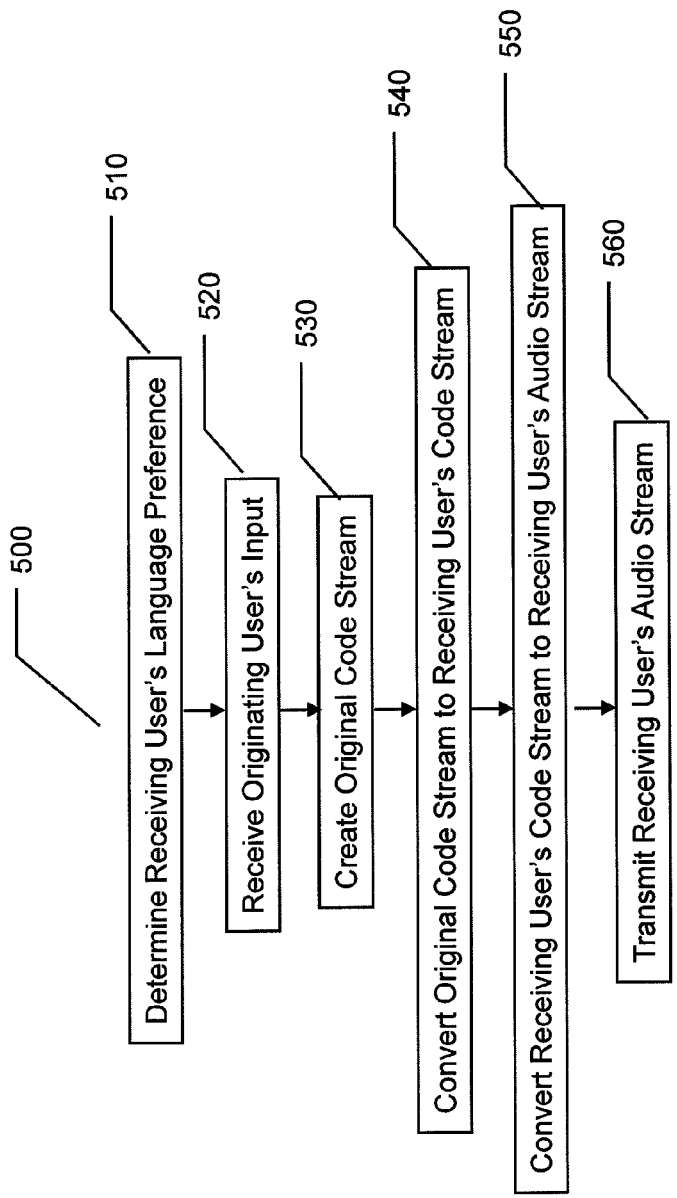
FIG. 5B is a flowchart illustrating a method of the multiple language translation system of the present invention according to an embodiment of the present invention.

Refer to FIG. 5B, which is a flowchart illustrating a method of the multiple language translation system of the present invention according to an embodiment of the present invention.

The method 500 illustrated in FIG. 5B begins in Step 510 by determining the receiving user's language preference. The originating user's input is then received in Step 520. In Step 530 the originating user's input is used to create an original code stream. Then, in Step 540 the original code stream is converted into a receiving user's code stream. Next, the receiving user's code stream is converted into a receiving user's audio stream in Step 550. Finally, in Step 560 the receiving user's audio stream is transmitted.

In an embodiment of the present invention the receiving user's audio stream is transmitted using a speaker system. For example, a presenter using a first language can speak to an entire audience that uses a second language. This eliminates the need for a translator who must interrupt the presenter.

Figure 6:
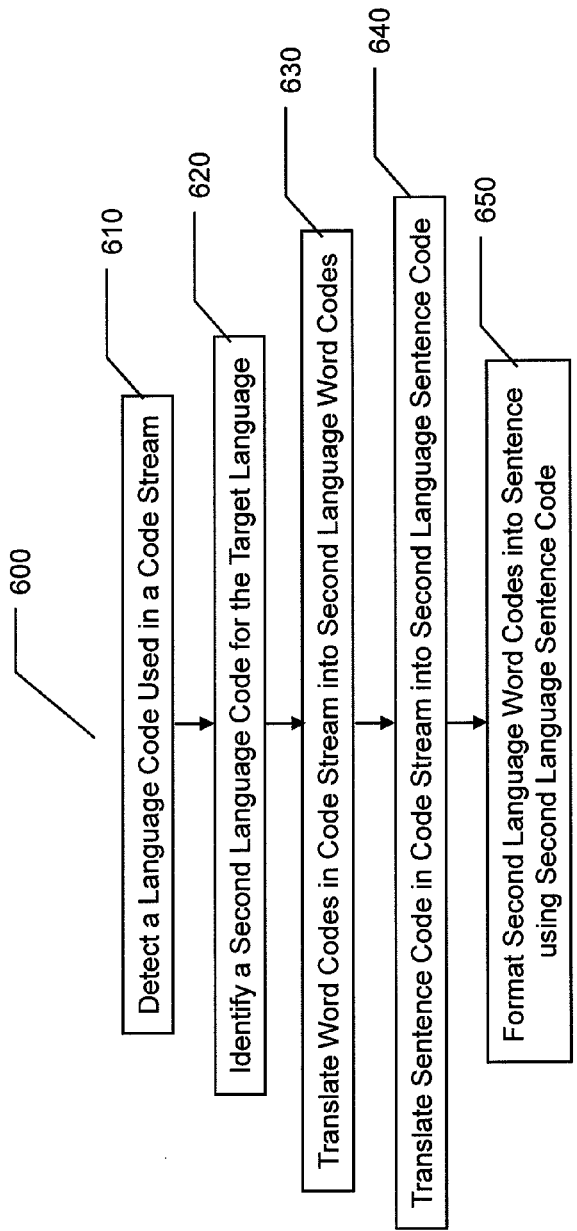
FIGS. 6-8 are flowcharts illustrating methods of the multiple language translation system of the present invention according to an embodiment of the present invention.

Refer to FIG. 6, which is a flowchart illustrating a method of the multiple language translation system of the present invention according to an embodiment of the present invention.

The method 600 illustrated in FIG. 6 begins in Step 610 by detecting a language code used in a code stream. In Step 620 a second language code for a target or second language is identified. The word codes in the code stream are translated into second language word codes in Step 630. In Step 640 the sentence code in the code stream is translated into a second language sentence code. Finally, the second language word codes are formatted into a sentence using the second language sentence code in Step 650.

Figure 7:
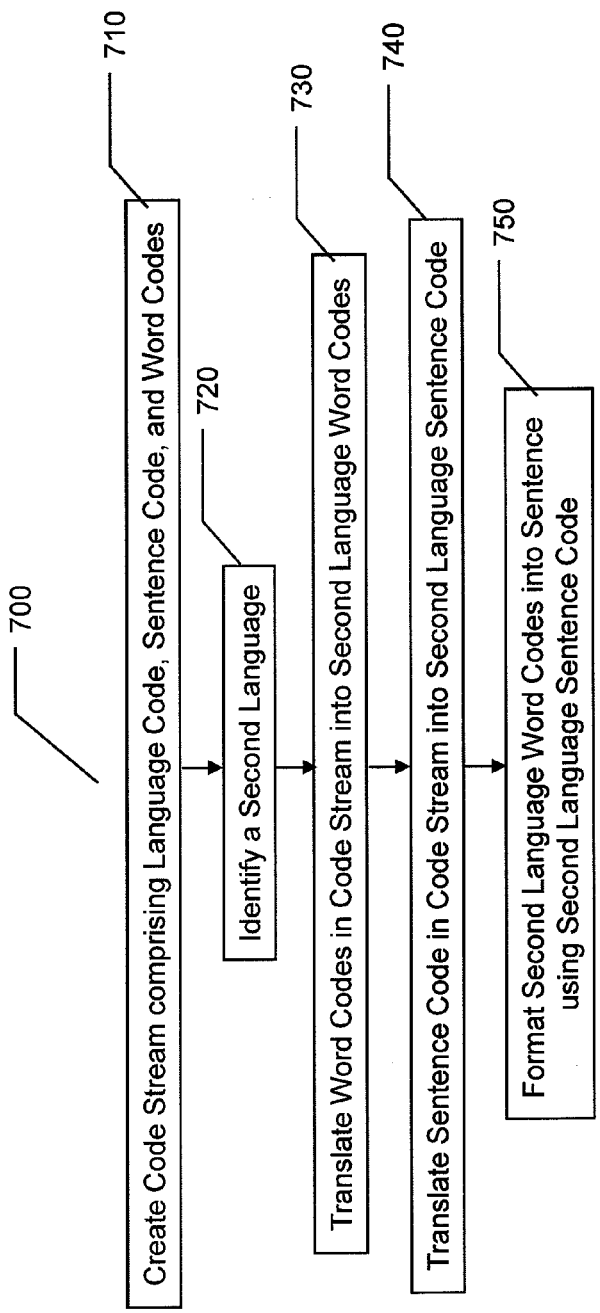

Refer to FIG. 7, which is a flowchart illustrating a method of the multiple language translation system of the present invention according to an embodiment of the present invention.

The method 700 begins in Step 710 by creating a code stream comprising a language code, a sentence code, and at least one word code. In situations where only one word code is used, the sentence code can be omitted. In Step 720 a second language is identified. The word codes in the code stream are then translated into word codes of the second language in Step 730. In Step 740 the sentence code in the code stream is translated into a sentence code for the second language. Finally, the second language word codes are formatted into a sentence using the second language sentence code in Step 750.

Figure 8:
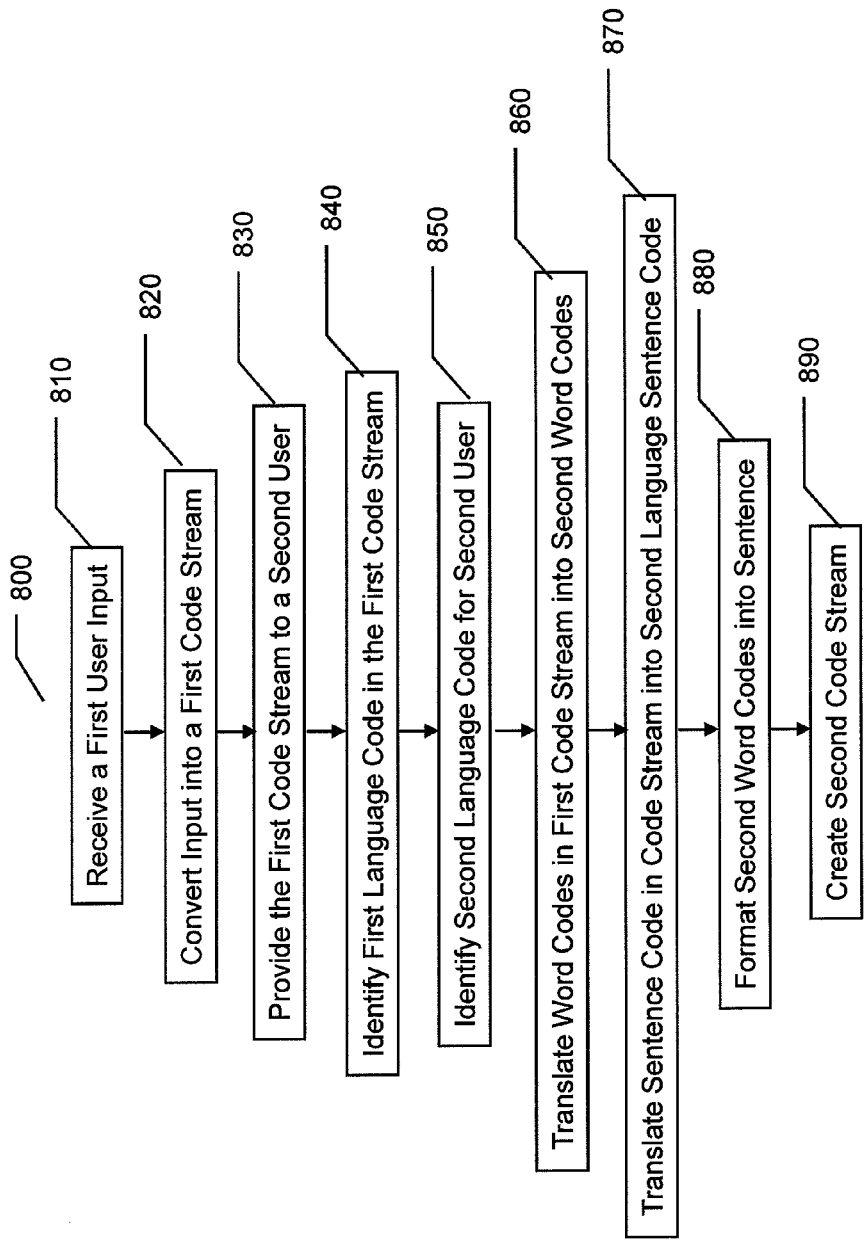

Refer to FIG. 8, which is a flowchart illustrating a method of the multiple language translation system of the present invention according to an embodiment of the present invention.

The method 800 begins in Step 810 by receiving a first user input. In Step 820 the first user input is converted into a first code stream. The first code stream is provided to a second user in Step 830. In Step 840 the first language code in the first code stream is identified and in Step 850 the second language code for the second user is identified. The word codes in the first code stream are translated into second language word codes in Step 860. In Step 870 the sentence code in the code stream is translated into a second language sentence code. The words represented by the second word codes are then formatted into a sentence using the second language sentence code in Step 880.

Figure 9A:
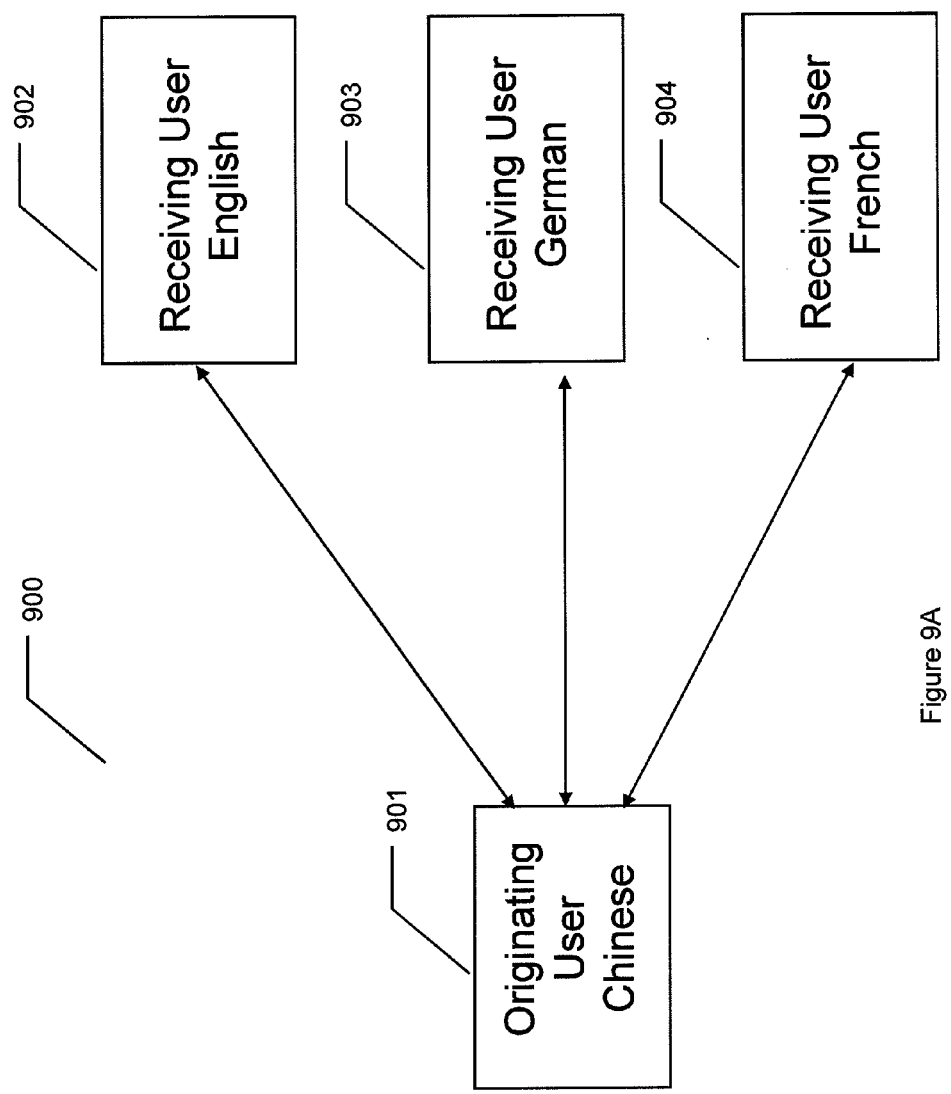
FIGS. 9A-9B are drawings illustrating an application structure for an auto-select function for a multiple language translation system according to an embodiment of the present invention.

Refer to FIG. 9A, which is a drawing illustrating an application structure for a translation link and popularity ranking function for the multiple language translation system of the present invention according to an embodiment of the present invention.

In the embodiment illustrated in FIG. 9A the multiple language translation system of the present invention further comprises a translation link and popularity ranking function 900. When the originator of the code stream sends the code stream to other users, the users receiving the code stream are presented with a list of various translations. The other users individually select which translation they believe is correct. Each individual user's selection will then be sent back to the originator of the code stream.

The originator's device, upon receiving the selections from the individual users, places these translation selections into the database and links the selections to the originator's code stream. As more receiving users provide selections back to the originator a popularity of correctness is attached to each translation of the original code stream. As a result, based on the popularity of the selected correct translation the most popular translation is provided first and less popular translations are provided subsequently.

Referring to FIG. 9A, the originator of the code stream 901 is, for example, using Chinese. Also, for example, receiving user 902 is using English, receiving user 903 is using German, and receiving user 904 is using French.

Originating user 901 sends a code stream to receiving users 902,903,904. Receiving user 902 is presented with options of possible translations in English, receiving user 903 is presented with options of possible translations in German, and receiving user 904 is presented with options of possible translations in French.

Each receiving user 902,903,904 reviews the translated options and selects which translation they individually believe or know to be correct. The selected translations are then sent back to the originating user 901 in, for example, a code or code stream. The device of the originating user 901 links the selected translations to the originating user's sentence in the original code stream in the system database. A popularity rating is attached to each translated sentence. As a translation is selected by users more frequently or less frequently the popularity rating is adjusted. When a code stream is sent the options for the translation are sorted according to the current popularity rating. As a result, the receiving users are presented with the most likely correct translations before less likely correct translations.

For example, the originating user uses the Chinese sentence "Wo Ai Ni" (我爱 我爱) and receiving users using English have responded with the selected translation "I Love You" 85% of the time, "Love You" 10% of the time, and "My Love" 5% of the time. Each of these English translations is linked to the original Chinese sentence in the database. When an originating user uses "Wo Ai Ni" (我爱) the English translation is either selected as "I Love You" or all translations are provided in descending order according to their popularity rating.

In an embodiment of the present invention the selected translations are linked and ranked according to the popularity in the originator's database.

In another embodiment of the present invention the selected translations are linked and ranked according to the popularity in both the originator's database and the receiving user's database.

Figure 9B:
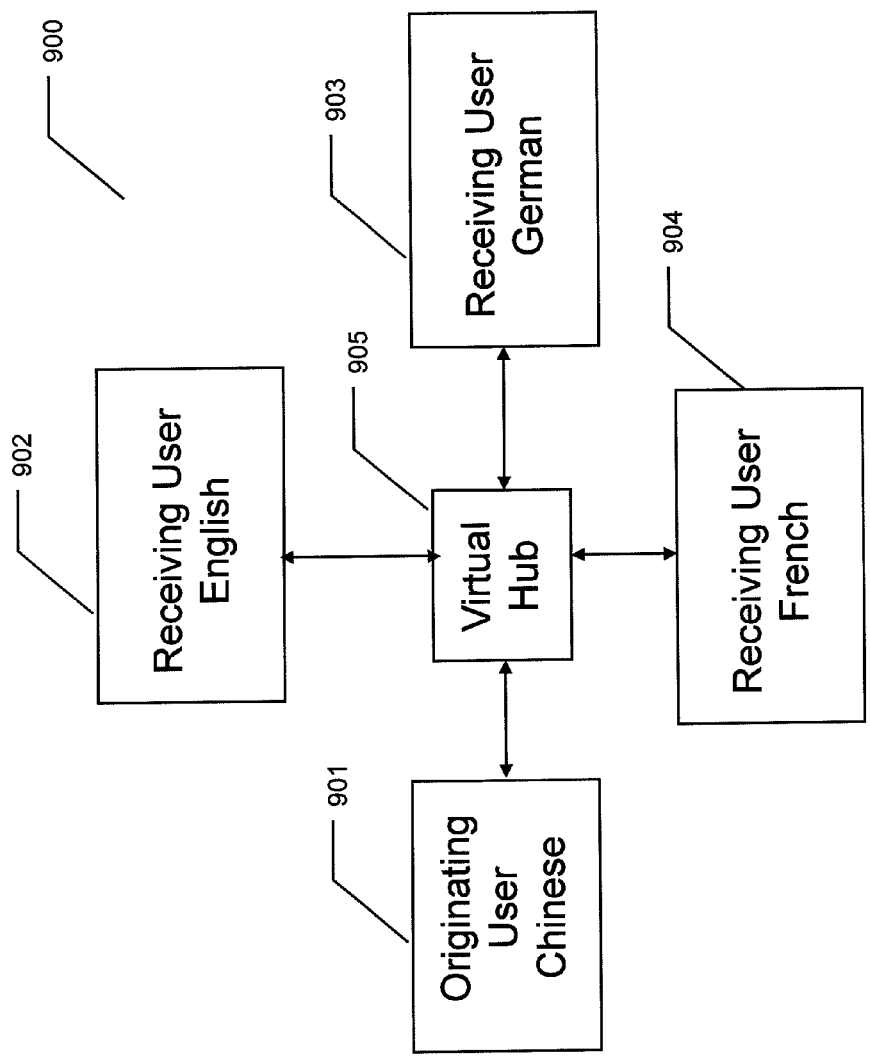

Refer to FIG. 9B, which is a drawing illustrating an application structure for a translation link and popularity ranking function for the multiple language translation system of the present invention according to an embodiment of the present invention.

In the embodiment illustrated in FIG. 9B the translation link and popularity ranking function 900 further comprises a virtual hub 905. This embodiment is similar to the embodiment illustrated in FIG. 9A; however, in the embodiment illustrated in FIG. 9B each user 901,902,903,904 receives the selected translation from each of the other users. In this way, each user's database is continually updated with translation links and popularity rankings. As a result, each user's translations in multiple translation system will be rapidly and continuous improved.

For example, the originating user 901 uses the Chinese sentence "Wo Ai Ni" (我爱) and receiving user 902 selects the English sentence "I Love You" as the correct translation and receiving user 904 selects the French sentence "Je t'aime". The selected translations for the English and French are provided via the virtual hub 905 to all users 901,902,903,904 even if the receiving user did not provide a selection (in this example user 903).

The original sentence in Chinese and the two selected translations in French and English are then linked or the link is updated in each user's database. Therefore, even users who may need a translation to that language at the current time, in the future a link to the translation and a popularity ranking is available.

In some embodiments of the present invention the translation can be selected to be provided on a display device or a speaker/headset. For example, with users whose hearing is limited, even if the original sentence was spoken the translation would appear on the display. Or, for users whose eyesight is limited, even if the original sentence was typed the translation would be output from the speaker/headset.

In some embodiments of the present invention the code stream comprises additional codes. For example, a speed code indicating the speed of the user's input, a volume code indicating the volume of the user's input, a punctuation code indicating the punctuation used in the sentence, etc.

Figure 10A:
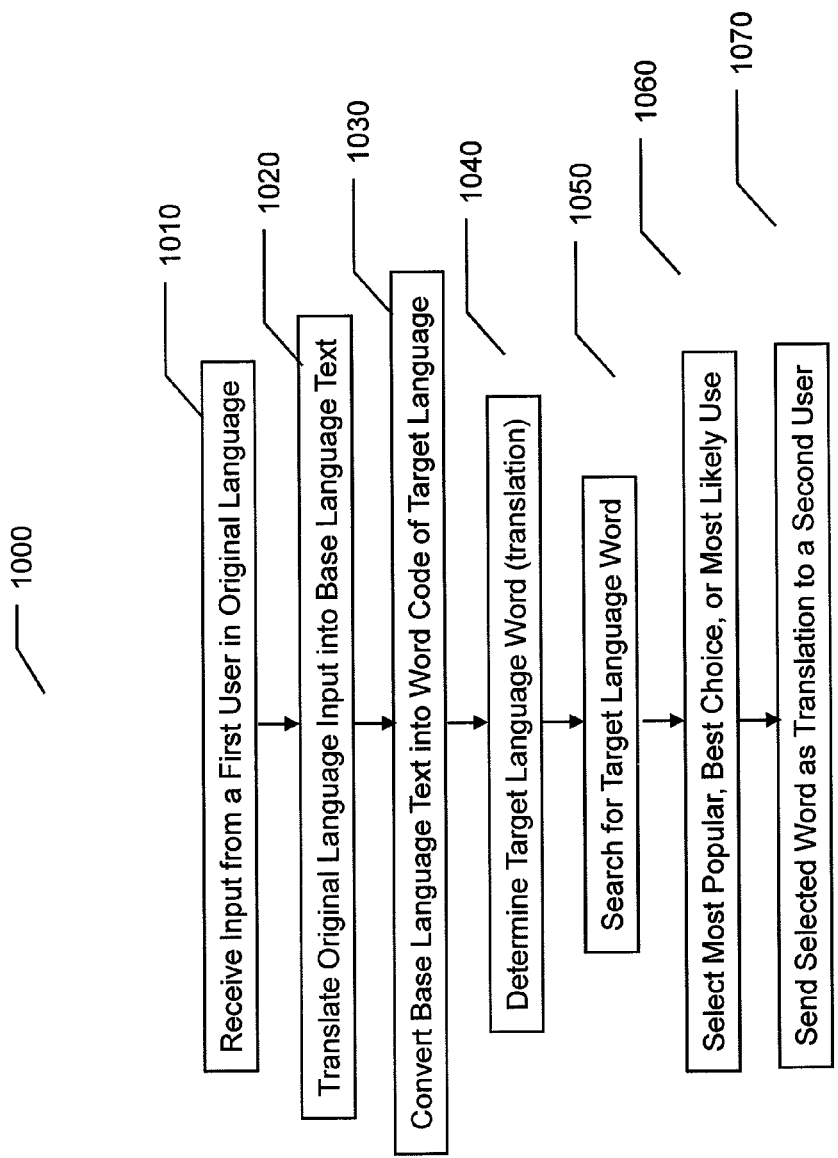
FIGS. 10A-10D are drawings illustrating flowcharts of a multiple language translation system of an embodiment of the present invention.

Refer to FIG. 10A, which is a drawing illustrating a flowchart of a multiple language translation system of an embodiment of the present invention.

The multiple language translation system 1000 begins by receiving an input from a first user in an original language in Step 1010. In Step 1020 the original language input by the first user is translated into text in a base language. Next, the base language text is converted into a word code of a target language in Step 1030. In Step 1040 the word in the target language is determined. The target language word is then searched for in Step 1050. After searching is completed a target language word is selected from the search results in Step 1060. For example, the most popular instance of the word, or the most likely instance of the word, or the best choice instance of the word is selected. Finally, in Step 1070 the selected word is sent to a user, for example a second user, as a translation. This translation is provided in the preferred language of the second user.

In this way, the first user provides an input in the first user's preferred language and the second user receives the translation of the input in the second user's preferred language.

Refer to FIG. 12A, which is a drawing illustrating a letter code system where letters in a base language are represented by numbers according to an embodiment of the present invention.

In the embodiments illustrated in FIGS. 10A-10D a letter code system shown in FIG. 12A is utilized.

In these embodiments a base language is selected. In this example English is selected as the base language for the system, however, in other embodiments other languages are selected as the base language.

As shown in FIG. 12A each letter of the English alphabet (A-Z) has an associated number; A=1, B=2, C=3 . . . N=14, O=15, P=16 . . . X=24, Y=25, Z=26.

Therefore, words in the English language can be written as numbers. For example:

$$PIG=16(P)9(I)7(G)=1697$$

Refer to FIG. 12B, which is a drawing illustrating format of a word code according to an embodiment of the present invention.

In the embodiment illustrated in FIG. 12B a word code 1200 comprises a language code 1210, a number code 1220, and a grammar code 1230. The language code 1210 indicates the language used, the number code 1220 represents a word in the base language, and the grammar code 1230 indicates grammatical usage or type of the word. The language code 1210, the number code 1220, and the grammar code 1230 each are formed using the letter coding illustrated in FIG. 12A.

Refer to FIG. 12C, which is a drawing illustrating a comparison of word codes for different languages according to an embodiment of the present invention.

In the example illustrated in FIG. 12C the word 1240 in the language 1205 is "Dog" in English. The language code 1210 for English is 514 (E=5 and N=14). The number code 1220 for "Dog" is 4157 (D=4, O=15, and G=7). Since "Dog" is a noun the grammar code 1230 is 14152114 (N=14, O=15, U=21, and N=14).

Therefore, the word code for the English word "Dog" is 514 4157 14152114.

In some embodiments of the present invention a separator or spacer is inserted between the language, number, and grammar code. For example 514#4157#14152114 is used where the # acts as a separator or #514#4157#14152114 is used where the # acts as a separator In another embodiment of the present invention the separators for each code are distinct. For example, # for language code, $ for number code, and % for grammar code. Distinct or different separators allow the language code, number code, and grammar code to be easily positioned in different orders or arrangements. For example, grammar code, number code, language code or number code, language code, grammar code, or number code, grammar code, language code, etc.

In another embodiment of the present invention each code has a defined length or size. For example, ten places with leading zeros or other characters such as 0000000514 or ######0514. Using the above example the code would be #######514######4157##14152114.

Continuing on with FIG. 12C, the language code 1210 for Chinese is 314 (CN), for French is 618 (FR), and for Spanish is 1916 (SP).

Since English was selected as the base language the number code 1220 and the grammar code 1230 remain the same for each language.

For example:
The word code for "Dog" in English is 514#4157#14152114;
The word code for Chinese is 314#4157#14152114 and represents " 狗 ";
The word code for French is 618#4157#14152114 and represents "Chien"; and
The word code for Spanish is 1916#4157#14152114 and represents "Perro".
Although the number code and the grammar code are the same letter coding for the base language, the language code determines the correct word in the target language.
Referring back to FIG. 1A, the following example is given:
For this example, the base language is selected as English, original language used by a first user is Spanish, and the preferred language of a second user is French.
A first user inputs the Spanish word "Perro". This is achieved by typing the word, speaking the word, scanning a document with the word, inputting by using a camera, viewing the word through a camera viewfinder, etc.
Next the Spanish word "Perro" is translated into the base language. In this example English was selected as the base language. Therefore "Perro" is translated into the English word "Dog".
The word "Dog" is then converted into a word code of the target language. Language code=618 (target language FR), number code=4157 (Base code "Dog", and the grammar code=14152114 (base code "Noun"). Therefore the word code of the target language is 618#4157#14152114.
Next the target language word represented by the word code 618#4157#14152114 is determined to be "Chien".
The target language word "Chien" is search for, for example, on a server, on a search engine server, by a search engine server, on a network, or on the internet.
After searching is complete the search results are analyzed to find the most popular, best choice, or most likely use or word.
Once the selection is made, the selected word is sent to the second user as a translation. In this case the French word "Chien" is received by the second user even though the first user input the Spanish word "Perro".

In an embodiment of the present invention the system further comprises a step of converting the base language text into a word code of the base language before forming a word code of the target language. This allows for translating the same word in the base language into numerous translations by changing the language code.

Figure 10B:
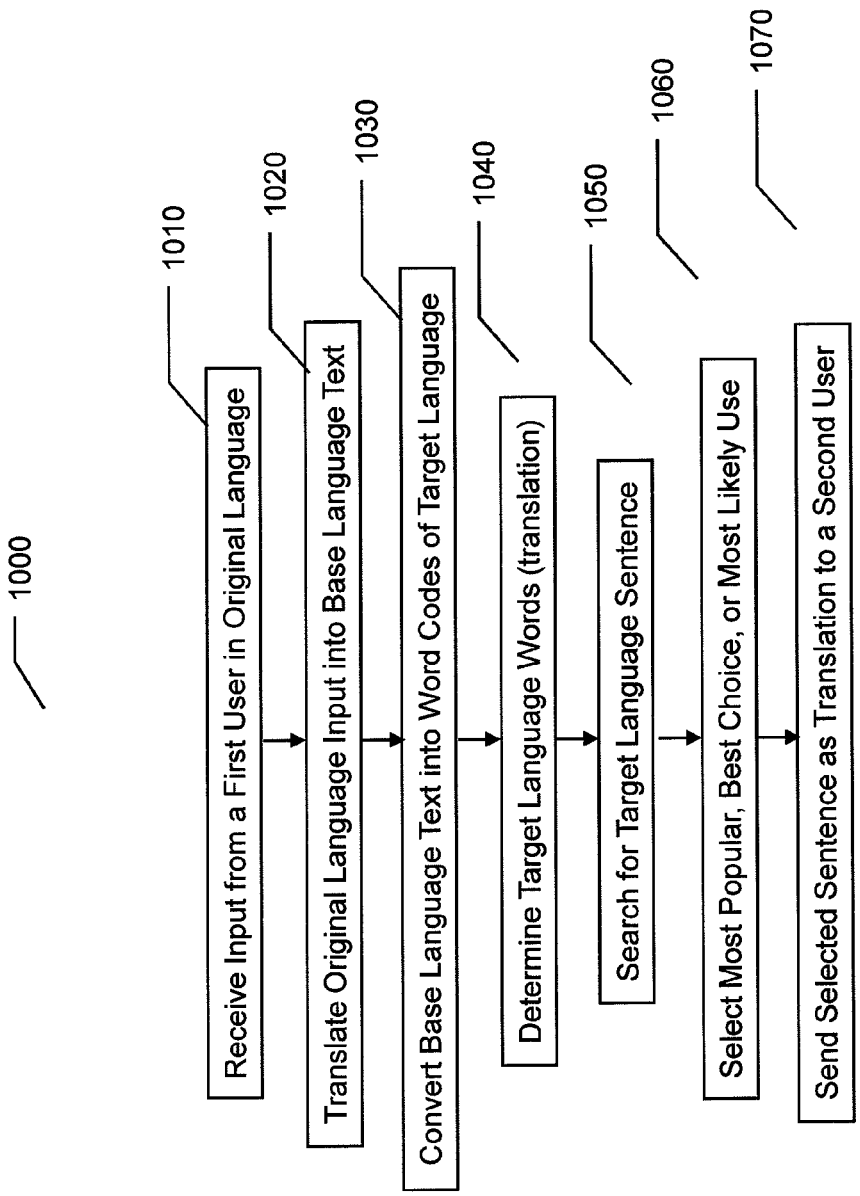

Refer to FIG. 10B, which is a drawing illustrating a flowchart of a multiple language translation system of an embodiment of the present invention.

The embodiment illustrated in FIG. 10B is similar to the embodiment illustrated in FIG. 10A. However, the embodiment of FIG. 10B provides translation of sentences rather than single words.

The system 1000 begins by receiving a plurality of words such as a sentence input by a first user in an original language in Step 1010. In Step 1020 the sentence is translated from the original language into text in the base language. Next, each of the words in the base language text is converted into a word code of the target language in Step 1030 and the target language words are determined in Step 1040. The target language words are then searched for in Step 1050. For example, searching a server, network, search engine server, or the internet for phrases or sentences using the target language words. The results of the search are then analyzed and a selection is made in Step 1060. The selection is made by certain criteria such as, for example, the most popular use of the target language words, the most likely usage of the phrase or sentence made from the target language words, or other criteria such as making a best choice for the appropriate use. After selecting the appropriate phrase or sentence from the search results, the selected sentence is sent to the second user as a translation in Step 1070.

For example, if the target language sentence is "It is rather hot today" the search results might return the following:
It's hot!
It's scorching outside
It's burning up
It's hot today, etc.

If the selection criteria is based on popularity then "It's hot!" might be chosen over "It is rather hot today" if it is more commonly used. This allows the system to provide a translation of a sentence that is more appropriate because the phrase is more commonly used. This is an advantage of the present invention as the system is continually updated with current language usage as language evolves.

Figure 10C:
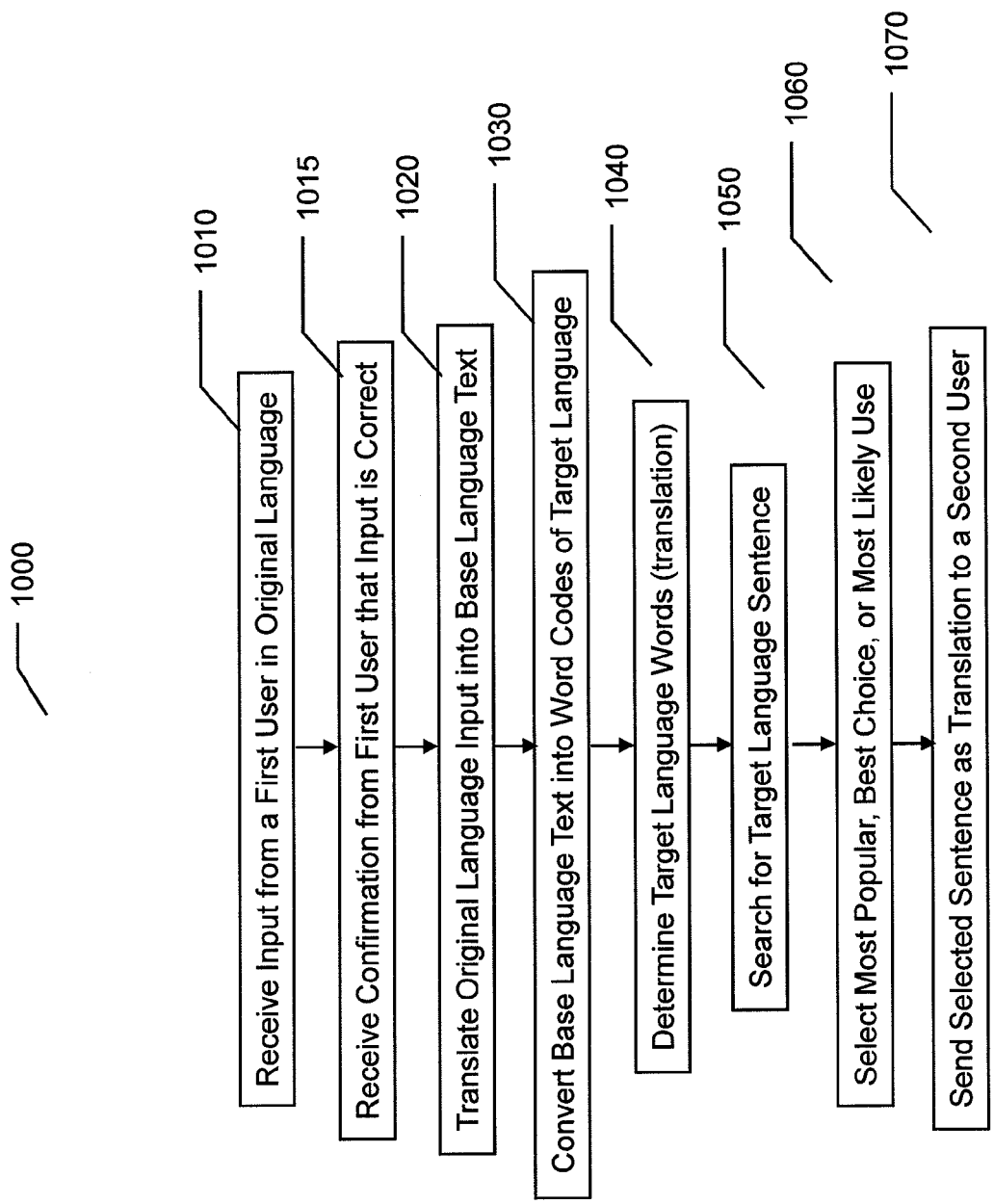

Refer to FIG. 10C, which is a drawing illustrating a flowchart of a multiple language translation system of an embodiment of the present invention.

The embodiment illustrated in FIG. 10C further comprises a step of receiving confirmation from the first user that the input is correct in Step 1015.

In the embodiment the system is prevented from performing wasteful tasks if the original input was incorrect. After inputting the first user observes the input and confirms that the input was received or input correctly.

Figure 10D:
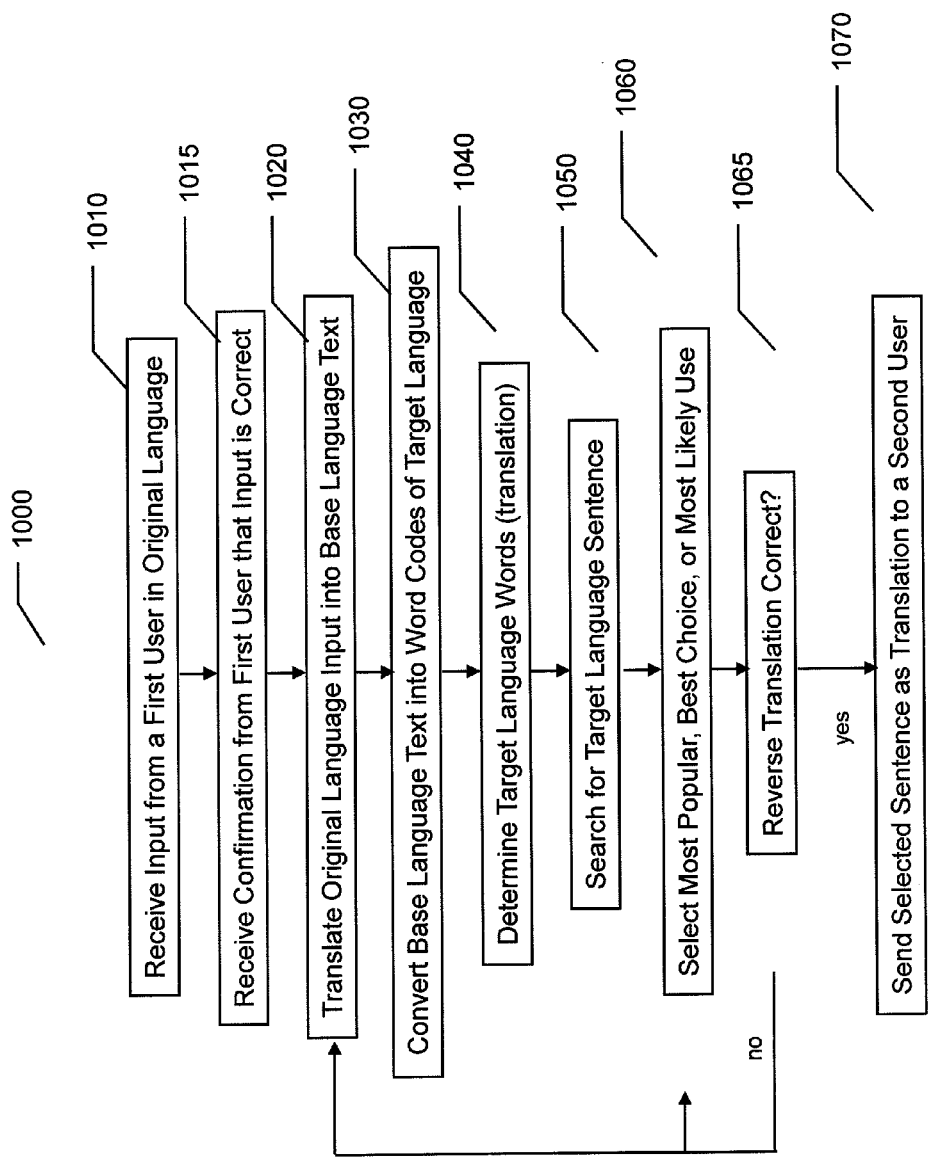

Refer to FIG. 10D, which is a drawing illustrating a flowchart of a multiple language translation system of an embodiment of the present invention.

In the embodiment illustrated in FIG. 10D the multiple language translation system 1000 further comprises a reverse translation process to confirm that the translation is correct in Step 1070. If the translation is correct the translation is sent to the second user in Step 1070. If incorrect, the system will return to Step 1020 or Step 1060. For example, if the system returns to Step 1060 another sentence is selected from the search results.

Figure 11A:
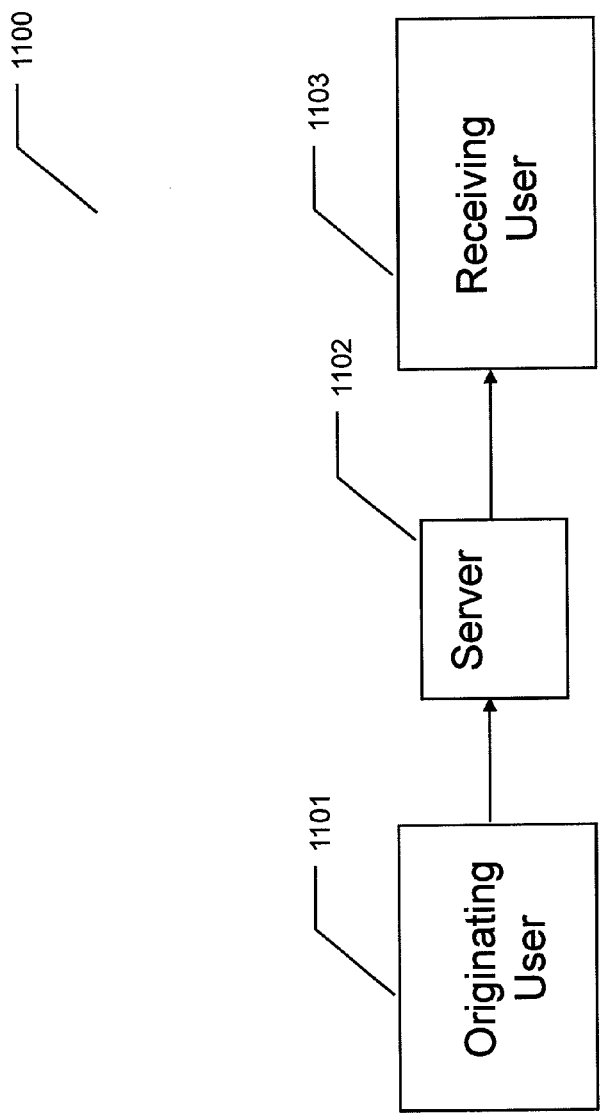
FIGS. 11A-11C are drawings illustrating an architecture of a multiple language translation system of an embodiment of the present invention.

Refer to FIG. 11A, which is a drawing illustrating an architecture of a multiple language translation system of an embodiment of the present invention.

In the embodiment illustrated in FIG. 11A the architecture 1100 of the system comprises an originating user device 1101, a server 1102, and a receiving user device 1103.

The originating user inputs a word, phrase, or sentence using the originating user device 1101. This input is then sent to the server 1102. The server 1102 then performs the translation of the original language input into the base language text, converts the base language text into a target language word code or word codes, determines the target language word or words, searches for the word or words, selects the best word, words, phrase, or sentence from the search results, and sends the selection to the receiving user device 1103. As a result, the originating user's input in the original language is translated and provided to the receiving user's device in the receiving user's preferred target language.

Figure 11B:
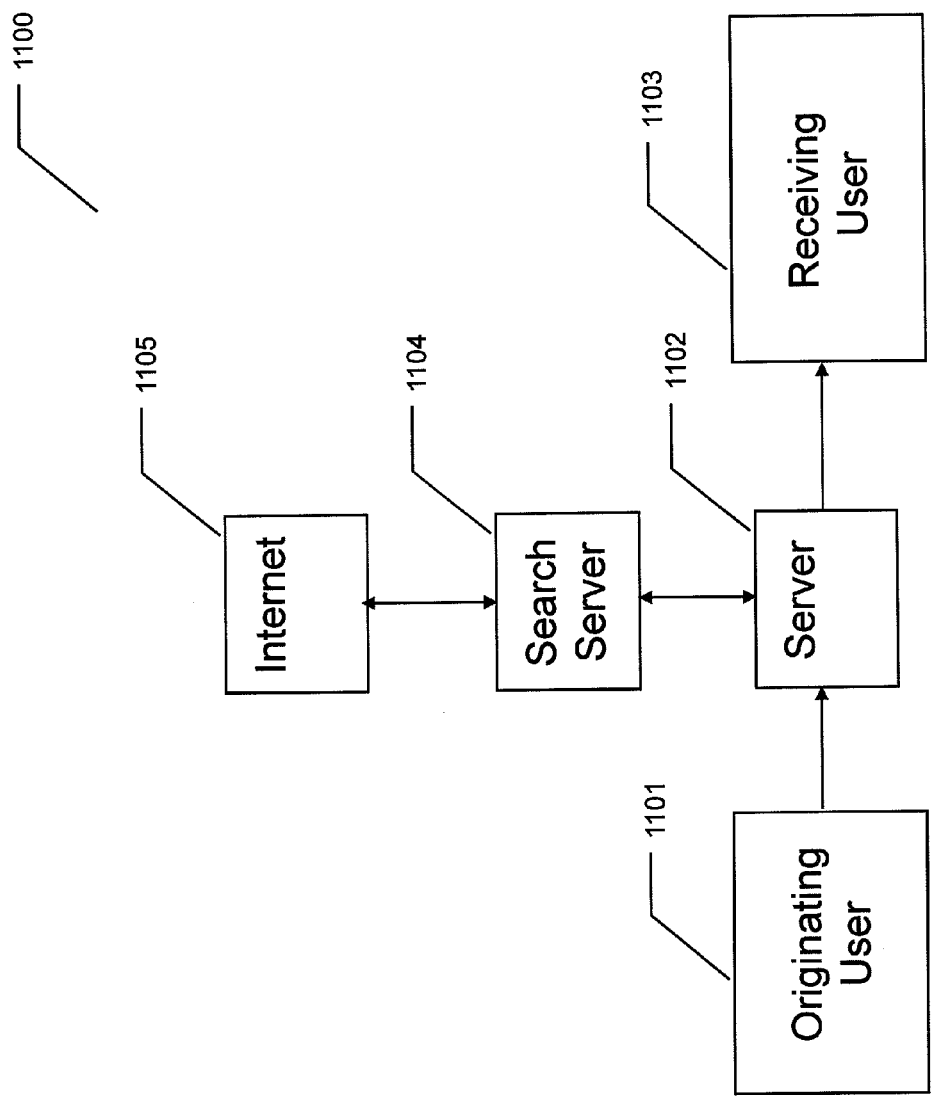

Refer to FIG. 11B, which is a drawing illustrating an architecture of a multiple language translation system of an embodiment of the present invention.

The embodiment illustrated in FIG. 11B is similar to the embodiment of FIG. 11B. However, the embodiment of FIG. 11 further comprises a search server 1104. The server 1102 performs the translation of the original language input into the base language text, converts the base language text into a target language word code or word codes, determines the target language word or words, and sends a search request for the target language word or words to the search server 1104. The search server 1104 then searches the internet 1105 for uses of the target language words and provides the search results to the server 1102. The server 1102 then selects the best word, words, phrase, or sentence from the search results, and sends the selection to the receiving user device 1103.

Figure 11C:
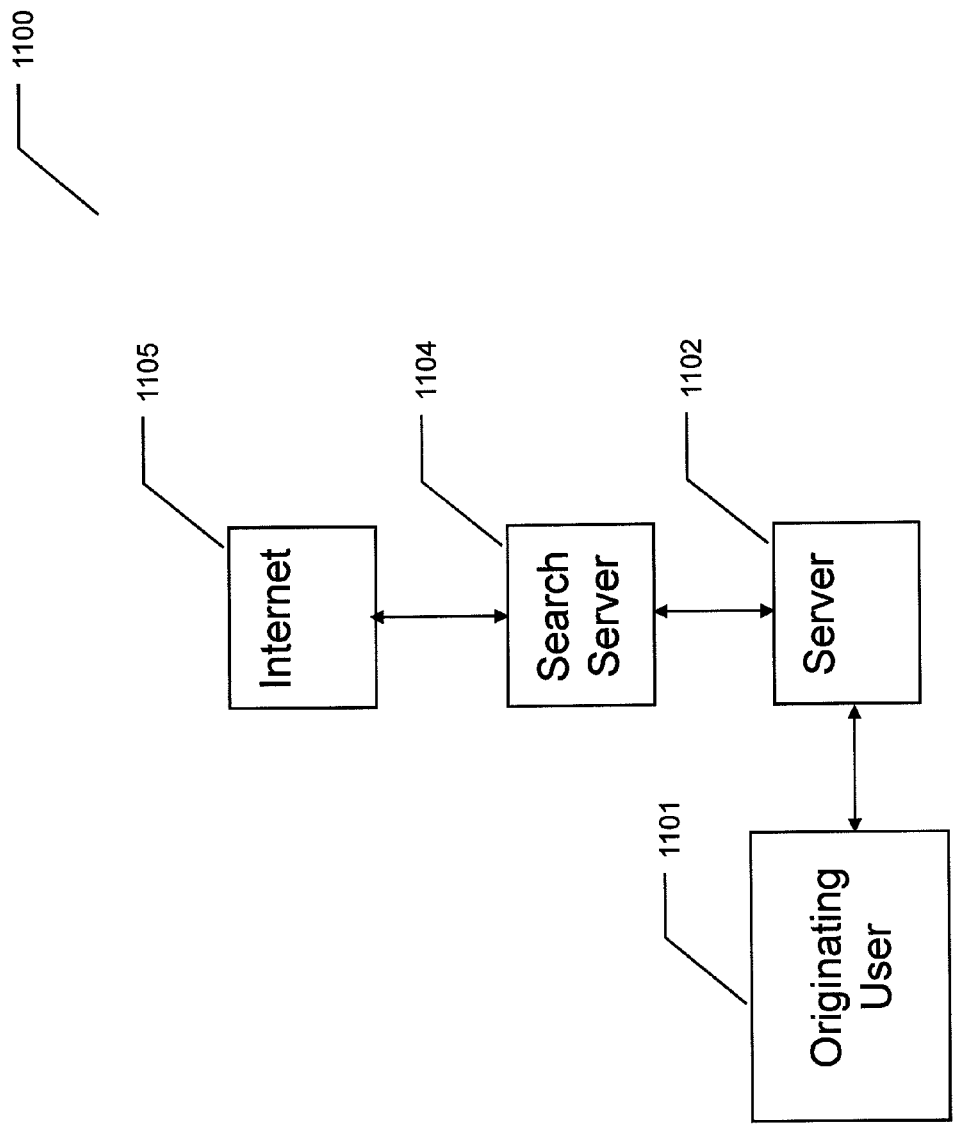

Refer to FIG. 11C, which is a drawing illustrating an architecture of a multiple language translation system of an embodiment of the present invention.

In the embodiment illustrated in FIG. 11C the server 1102 sends the selection to the originating user device 1101 rather than sending the selection to a second user device. This allows the originating user to see or hear the translation so that the originating user can make use of the translation directly. This is useful for studying a second language or for onsite translation that can be used by someone that is in close proximity to the originating user but doesn't have a user device.

In an embodiment of the present invention the multiple language translation system is utilized in a telephone conversation or a conference call with multiple users. For example, a first user makes a call to a second user. After being connected the first user speaks into their handset or types into their handset a sentence or phrase in the first user's language. The second user will hear or see a translation of the sentence or phrase in the second user's language. In an embodiment of the present invention the translation, conversion, searching, and selection of translation from search results are performed by the first user's handset. In another embodiment the translation conversion, searching, and selecting processes are performed by a server separate from the first user's handset. As a result, users can communicate with other users using their own language and telephone handsets.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A communication device for a multiple language translation system comprising:
  a main housing for holding electrical components and circuitry utilized for operation of the communication device;
  a wireless transmitter receiver module for communicating with other devices, the wireless transmitter receiver module comprising:
    a bluetooth transceiver for connecting with other communication devices for the multiple language translation system and allowing the communication device to communicate using the multiple language translation system with the other communication devices; and
    a wi-fi transceiver for connecting to the Internet; the communication device receiving an original language input from an originating user via the bluetooth transceiver; translating the original language input into base language text; converting the base language text into at least one word code; determining at least one target language word using the at least one word code; searching for the at least one target language word on the Internet via the wi-fi transceiver; ranking search result entries based on user preferred translations submitted by other users; selecting a search result entry from search results based on user preferred translations ranking; performing a reverse translation process on the selected search result entry to translate the selected search result entry back into a language of the original language input; presenting result of the reverse translation process to the originating user in the language of the original language input via the bluetooth transceiver; receiving via the bluetooth transceiver an indication from the originating user that the result of the reverse translation process is correct; selecting another search result entry from the search results if the originating user indicates that the result of the reverse translation process is not correct; performing the reverse translation process and presenting the result of the reverse translation process to the originating user until the originating user indicates that the result of the reverse translation process is correct; and updating a database of the communication device with results of the reverse translation process, search result entry rankings, and indications made by the originating user about the results of the reverse translation process;
  an earphone for providing audible translations;
  at least one operation switch for controlling operation settings of the communication device; and
  at least one signal indicator for visually indicating status of the communication device, the at least one signal indicator visually indicating which communication devices are connected together and allowing other communication device users to see the status of the communication device.

2. The communication device for a multiple language translation system of claim 1, where the wireless transmitter receiver module, the earphone, the at least one operation switch, and the least one signal indicator in combination with a frame allow the communication device to be worn like a pair of eyeglasses.

3. The communication device for a multiple language translation system of claim 1, further comprising:
  a camera for capturing video, images, and text.

4. The communication device for a multiple language translation system of claim 1, further comprising:
  a display for displaying translations, text, and image data.

5. The communication device for a multiple language translation system of claim 1, further comprising:
  a microphone for capturing spoken communication.

6. The communication device for a multiple language translation system of claim 1, further comprising:
  a remote control located separately from the main housing but a part of the communication device for controlling settings and operations of the communication device, the remote control connecting to electrical components in the main housing.

7. The communication device for a multiple language translation system of claim 1, further comprising:
  a memory for storing a conversation, a translation, and a translation database.

8. The communication device for a multiple language translation system of claim 1, the operation switch comprising:
  a language switch for temporarily selecting a second language to be used by a user of the communication device when pressed and returning to a first language when the language switch is released.

9. The communication device for a multiple language translation system of claim 1, the operation switch comprising:
  a status switch for selecting a status mode;
  a mode switch for selecting an operating mode of the communication device, the mode switch switching between broadcast mode, bidirectional mode, and omnidirectional mode; and
  a detect select switch for detecting and selecting only other communication devices within a set proximity even though other communication devices are available.

10. The communication device for a multiple language translation system of claim 1, the operation switch comprising:
  a speak request switch for requesting control of a conversation.

11. A communication device for a multiple language translation system comprising:
  a main housing for holding electrical components and circuitry utilized for operation of the communication device;
  a wireless transmitter receiver module for communicating with other devices, the wireless transmitter receiver module comprising:
    a bluetooth transceiver for connecting with other communication devices for the multiple language translation system and allowing the communication device to communicate using the multiple language translation system with the other communication devices; and
    a wi-fi transceiver for connecting to the Internet; the communication device receiving an original language input from an originating user via the bluetooth transceiver; translating the original language input into base language text; converting the base language text into at least one word code; determining at least one target language word using the at least one word code; searching for the at least one target language word on the Internet via the wi-fi transceiver; ranking search result entries based on user preferred translations submitted by other users; selecting a search result entry from search results based on user preferred translations ranking; performing a reverse translation process on the selected search result entry to translate the selected search result entry back into a language of the original language input; presenting result of the reverse translation process to the originating user in the language of the original language input via the bluetooth transceiver; receiving via the bluetooth transceiver an indication from the originating user that the result of the reverse translation process is correct; selecting another search result entry from the search results if the originating user indicates that the result of the reverse translation process is not correct; performing the reverse translation process and presenting the result of the reverse translation process to the originating user until the originating user indicates that the result of the reverse translation process is correct; and updating a database of the communication device with results of the reverse translation process, search result entry rankings, and indications made by the originating user about the results of the reverse translation process;

an earphone for providing audible translations;

at least one operation switch for controlling operation settings of the communication device;

a detect select switch for detecting and selecting only other communication devices within a set proximity even though other communication devices are available for connection;

at least one signal indicator for visually indicating status of the communication device, the at least one signal indicator visually indicating which communication devices are connected together and allowing other communication device users to see the status of the communication device;

a camera for capturing video, images, and text;

a display for displaying translations, text, and image data; and a microphone for capturing spoken communication.

12. The communication device for a multiple language translation system of claim 11, where the wireless transmitter receiver module, the earphone, the at least one operation switch, the least one signal indicator, the camera, the display, and the microphone in combination with a frame allow the communication device to be worn like a pair of eyeglasses, and the camera is disposed on a front bridge of the frame to capture what a user wearing the communication device is looking at, the display is disposed in a display frame of the frame in front of an eye of the user, and the earphone is disposed on a flexible earphone frame of the frame.

13. The communication device for a multiple language translation system of claim 11, further comprising:
a memory for storing a conversation, a translation, and a translation database.

14. The communication device for a multiple language translation system of claim 11, further comprising:
a remote control located separately from the main housing but a part of the communication device for controlling settings and operations of the communication device, the remote control wirelessly connecting to electrical components in the main housing.

15. The communication device for a multiple language translation system of claim 11, the operation switch comprising:
a language switch for temporarily selecting a second language to be used by a user of the communication device when pressed and returning to a first language when the language switch is released.

16. The communication device for a multiple language translation system of claim 11, the operation switch comprising:
a status switch for selecting a status mode; and
a mode switch for selecting an operating mode of the communication device, the mode switch switching between broadcast mode, bidirectional mode, and omnidirectional mode.

17. A communication device and remote control for a multiple language translation system comprising:
a main housing for holding electrical components and circuitry utilized for operation of the communication device;
a wireless transmitter receiver module disposed in the main housing for communicating with other devices, the wireless transmitter receiver module comprising:
a bluetooth transceiver for connecting with other communication devices for the multiple language translation system and allowing the communication device to communicate using the multiple language translation system with the other communication devices; and
a wi-fi transceiver for connecting to the Internet; the communication device receiving an original language input from an originating user via the bluetooth transceiver; translating the original language input into base language text; converting the base language text into at least one word code; determining at least one target language word using the at least one word code; searching for the at least one target language word on the Internet via the wi-fi transceiver; ranking search result entries based on user preferred translations submitted by other users; selecting a search result entry from search results based on user preferred translations ranking; performing a reverse translation process on the selected search result entry to translate the selected search result entry back into a language of the original language input; presenting result of the reverse translation process to the originating user in the language of the original language input via the bluetooth transceiver; receiving via the bluetooth transceiver an indication from the originating user that the result of the reverse translation process is correct; selecting another search result entry from the search results if the originating user indicates that the result of the reverse translation process is not correct; performing the reverse translation process and presenting the result of the reverse translation process to the originating user until the originating user indicates that the result of the reverse translation process is correct; and updating a database of the communication device with results of the reverse translation process, search result entry rankings, and indications made by the originating user about the results of the reverse translation process;

a voice synthesizer disposed in the main housing for simulating spoken language from text;

an earphone for providing audible translations;

at least one operation switch for controlling operation settings of the communication device;

a detect select switch for detecting and selecting only other communication devices within a set proximity even though other communication devices are available for connection;

at least one signal indicator for visually indicating status of the communication device, the at least one signal indicator visually indicating which communication devices are connected together, and visually indicating which language a user of the communication device is using, the at least one signal indicator allowing other communication device users to see the status of the communication device;

a camera for capturing video, images, and text;

a display for displaying translations, text, and image data;

a microphone for capturing spoken communication;

a memory for storing a conversation, a translation, and a translation database;

a frame holding the camera, the main housing, the microphone, the earphone, and the display for allowing the communication device to be worn as eyeglasses, and the camera is disposed on a front bridge of the frame to capture what a user wearing the communication device is looking at, the display is disposed in a display frame of the frame in front of an eye of the user, and the earphone is disposed on a flexible earphone frame of the frame; and the remote control located separately from the main housing for wirelessly controlling settings and operations of the communication device.

18. The communication device and remote control for a multiple language translation system of claim 17, the operation switch comprising:

a language switch for temporarily selecting a second language to be used by a user of the communication device when pressed and returning to a first language when the language switch is released.

19. The communication device and remote control for a multiple language translation system of claim 17, the operation switch comprising:

a mode switch for selecting an operating mode of the communication device, the mode switch switching between broadcast mode, bidirectional mode, and omnidirectional mode.

\* \* \* \* \*